(12) United States Patent
Ebrahimi Afrouzi et al.

(10) Patent No.: US 12,111,664 B1
(45) Date of Patent: *Oct. 8, 2024

(54) VERSATILE ROBOTIC DEVICE

(71) Applicants: Ali Ebrahimi Afrouzi, Henderson, NV (US); Lukas Robinson, York (CA); Chen Zhang, Redmond, WA (US)

(72) Inventors: Ali Ebrahimi Afrouzi, Henderson, NV (US); Lukas Robinson, York (CA); Chen Zhang, Redmond, WA (US)

(73) Assignee: AI Incorporated, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/888,921

(22) Filed: Aug. 16, 2022

Related U.S. Application Data

(63) Continuation of application No. 16/389,797, filed on Apr. 19, 2019, now Pat. No. 11,454,981.

(60) Provisional application No. 62/746,688, filed on Oct. 17, 2018, provisional application No. 62/740,580, filed on Oct. 3, 2018, provisional application No. 62/740,573, filed on Oct. 3, 2018, provisional application No. 62/688,497, filed on Jun. 22, 2018, provisional application No. 62/674,994, filed on May 22, 2018, provisional application No. 62/669,509, filed on May 10, 2018, provisional application No. 62/665,942, filed on May 2, 2018, provisional application No. 62/665,095, filed on May 1, 2018, provisional application No. 62/664,389, filed on Apr. 30, 2018, provisional application No. 62/660,540, filed on Apr. 20, 2018, provisional application No. 62/660,789, filed on Apr. 20, 2018.

(51) Int. Cl.
G05D 1/00 (2024.01)
B25J 5/00 (2006.01)
B25J 9/00 (2006.01)

(52) U.S. Cl.
CPC ............ G05D 1/0248 (2013.01); B25J 5/007 (2013.01); B25J 9/0003 (2013.01); G05D 1/0236 (2013.01); G05D 1/027 (2013.01); G05D 1/0272 (2013.01)

(58) Field of Classification Search
None
See application file for complete search history.

(56) References Cited

U.S. PATENT DOCUMENTS

| | | | | |
|---|---|---|---|---|
| 8,924,019 B2 * | 12/2014 | Tang | ...................... | A47L 9/2852 382/103 |
| 9,946,263 B2 * | 4/2018 | Lindhé | .................. | G05D 1/0248 |
| 2013/0232717 A1 * | 9/2013 | Lee | ................... | G08B 13/19613 901/1 |
| 2017/0090456 A1 * | 3/2017 | Mao | ....................... | G05B 19/404 |
| 2018/0055312 A1 * | 3/2018 | Jung | ....................... | G06T 19/006 |

(Continued)

Primary Examiner — Jaime Figueroa
Assistant Examiner — Arslan Azhar

(57) ABSTRACT

Provided is a robot, including: a chassis; a set of wheels; a plurality of sensors; a camera; a processor; a memory storing instructions that when executed by the processor effectuate operations including: capturing, with the camera, spatial data of surroundings of the robot; generating, with the processor, a spatial model of the surroundings based on at least the spatial data of the surroundings; generating, with the processor, a movement path based on the spatial model of the surroundings; and inferring, with the processor, a location of the robot.

18 Claims, 24 Drawing Sheets

100 — Obtaining a plurality of spatial data, each spatial data corresponding to a respective field of view of a camera at the time the respective spatial data was captured by the camera 101 — Aligning the spatial data based on overlap between spatial data captured in different fields of view 102 — Determining a map (or spatial model) of the surroundings based on alignment of the spatial data

(56) References Cited

U.S. PATENT DOCUMENTS

| | | | | |
|---|---|---|---|---|
| 2018/0149753 | A1* | 5/2018 | Shin | G01S 7/4811 |
| 2018/0255997 | A1* | 9/2018 | So | B25J 11/00 |
| 2018/0317725 | A1* | 11/2018 | Lee | B25J 11/0085 |
| 2019/0204851 | A1* | 7/2019 | Afrouzi | B25J 9/1664 |
| 2023/0000302 | A1* | 1/2023 | Oyaizu | G06V 20/52 |
| 2023/0084829 | A1* | 3/2023 | Sung | A47L 13/512 |

* cited by examiner

FIG. 4
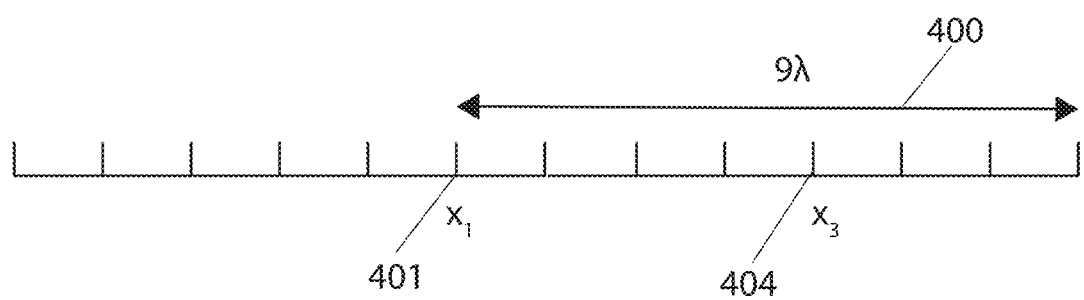
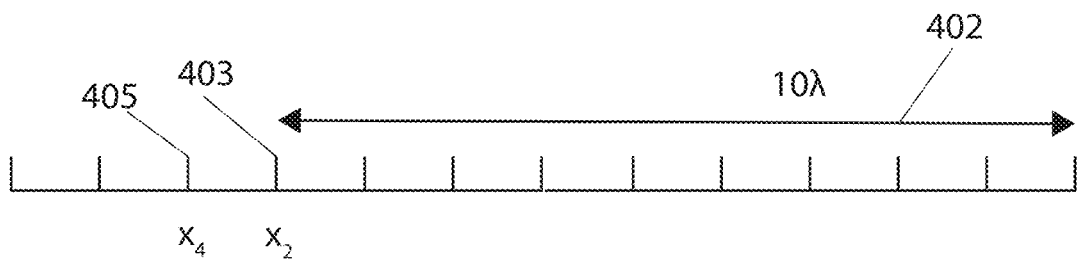

VERSATILE ROBOTIC DEVICE

CROSS-REFERENCE TO RELATED APPLICATIONS

This application is a Continuation of U.S. Non-Provisional patent application Ser. No. 16/389,797, filed Apr. 19, 2019, which claims the benefit of Provisional Patent Application Nos. 62/660,789, filed Apr. 20, 2018, 62/660,540, filed Apr. 20, 2018, 62/664,389, filed Apr. 30, 2018, 62/665,942, filed May 2, 2018, 62/746,688, filed Oct. 17, 2018, 62/740,573, filed Oct. 3, 2018, 62/665,095, filed May 1, 2018, 62/674,994, filed May 21, 2018, 62/688,497, filed Jun. 22, 2018, 62/740,580, filed Oct. 2, 2018, and 62/669,509, filed May 10, 2018, each of which is hereby incorporated by reference.

In this patent, certain U.S. patents, U.S. patent applications, or other materials (e.g., articles) have been incorporated by reference. Specifically, U.S. patent application Ser. Nos. 16/048,179, 16/048,185, 16/163,541, 16/163,562, 16/163,508, 16/185,000, 62/681,965, 62/614,449, 16/041,286, 15/406,890, 14/673,633, 16/163,530, 16/297,508, 62/740,573, 62/740,580, 15/955,480, 15/425,130, 15/955,344, 15/243,783, 15/954,335, 15/954,410, 15/257,798, 15/674,310, 15/224,442, 15/683,255, 14/817,952, 16/198,393, 62/740,558, 15/447,450, 15/447,623, 15/951,096, 16/127,038, 16/239,410, 16/230,805, 16/129,757, 16/127,038, 16/243,524, 62/672,878, 62/729,015, and 16/751,115, are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

The present disclosure relates to mobile robotic devices.

BACKGROUND

Autonomous robotic device, such as robotic devices, are increasingly used in commercial and residential establishments. Robotic devices can operate autonomously by generating a map of the environment for navigating, avoiding obstacles while performing work, and for planning a movement path. Robotic devices localize themselves within the environment to locate their position within the map of the environment. For a robotic device to function autonomously, it must be able of repeatedly determining its location in the environment after executing a movement within the environment. To execute tasks autonomously robotic devices must have a sense of their location within its surroundings, particularly to avoid repetitive tasks that have already been completed. For example, for a robotic device, a repetitive task may be cleaning an area that has already been cleaned.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some aspects provide is a robot, including: a chassis; a set of wheels; a plurality of sensors; a camera; a processor; a memory storing instructions that when executed by the processor effectuate operations including: capturing, with the camera, spatial data of surroundings of the robot; generating, with the processor, a spatial model of the surroundings based on at least the spatial data of the surroundings; generating, with the processor, a movement path based on the spatial model of the surroundings; and inferring, with the processor, a location of the robot, including at least: capturing, with at least one sensor of the plurality of sensors, at least one measurement of the surroundings of the robot.

Some aspects provide a memory storing instructions that when executed by a processor of a robot effectuate the above-described operations.

Some aspects include a method for operating a robot, including: capturing, with a camera disposed on the robot, spatial data of surroundings of the robot; generating, with the processor, a spatial model of the surroundings based on at least the spatial data of the surroundings; generating, with the processor, a movement path based on the spatial model of the surroundings; and inferring, with the processor, a location of the robot, including at least: capturing, with at least one sensor of a plurality of sensors disposed on the robot, at least one measurement of the surroundings of the robot.

BRIEF DESCRIPTION OF THE DRAWINGS

FIG. 4 illustrates an embodiment of alternative localization scenarios wherein localization is given in multiples of A.

DETAILED DESCRIPTION OF SOME EMBODIMENTS

Figure 1:
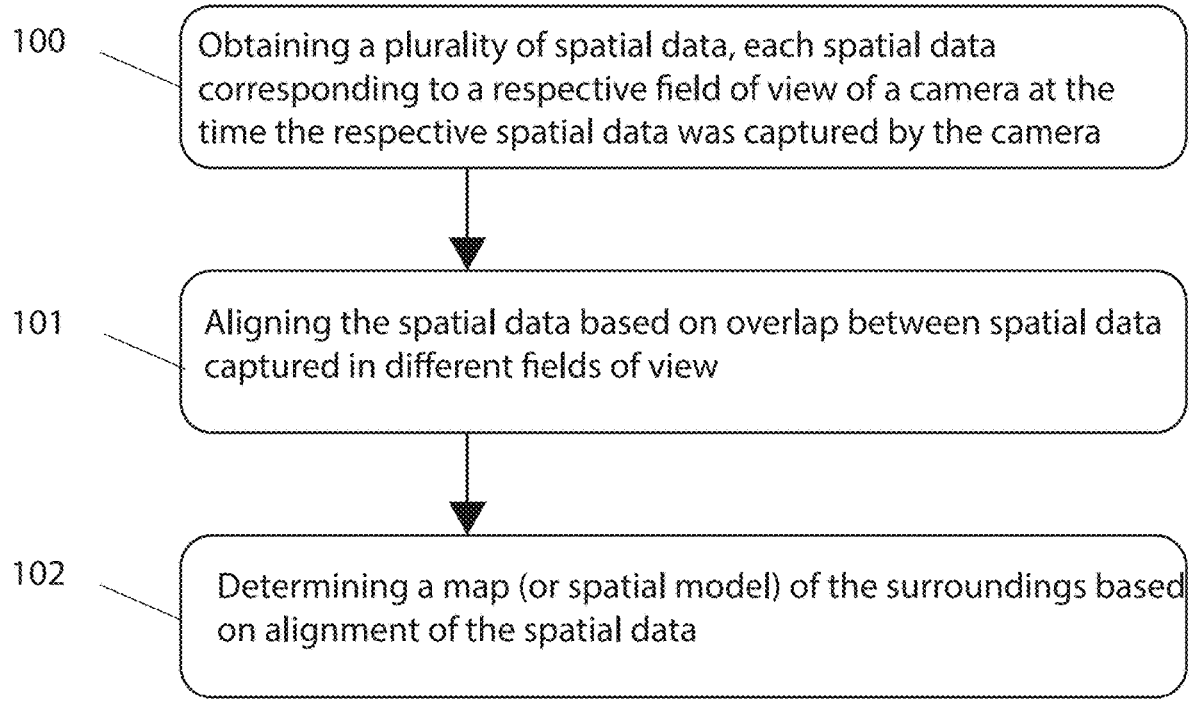
FIG. 1 illustrates a flowchart describing an example of a method for generating a map of the environment, according to some embodiments.

The present invention will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present invention may be practiced without some or all of these specific details. In other instances, well known process steps and/or structures have not been described in detail in order to not unnecessarily obscure the present invention. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

In some embodiments, a robotic device used within commercial or residential establishments may include one or more autonomous or semi-autonomous robotic devices having communication, an actuator, mobility, and/or processing elements. The robotic device may, but is not required to include (which is not to suggest that any other described feature is required in all embodiments), a casing (like a shell), a chassis, a transport drive system such as wheels or other mobility device, a motor to drive the wheels or other mobility device, one or more tools (e.g., brush for a robotic device, blade for a robotic mower, a plow for a robotic plow, etc.), a receiver that acquires signals transmitted from, for example, a transmitting beacon, a processor, a controller, memory, network or wireless communications, power management, etc., and one or more clock or synchronizing devices. The robotic device may also include a power module for delivering (and in some cases storing) electrical power and a sensor module for observing the environment and for sending commands based on the observed environment. The sensor module may include sensors for detecting obstacles, types of flooring, cliffs, system status, temperature, movement, and the like. An interface module may also be included to provide an interface between the robotic device and a user. The robotic device may further include infrared (IR) sensors, tactile sensors, sonar sensors, gyroscopes, ultrasonic range finder sensors, depth sensing cameras, odometer sensors, optical encoder, time-of-flight sensors, optical flow sensors, LIDAR, LADAR, cameras, IR illuminators, remote controls, Wi-Fi capability, network card, Bluetooth capability, cellular functionality, USB ports and radio frequency (RF) transmitter/receiver. Other types of robotic devices with other configurations may also be used and implement the techniques described herein.

In some embodiments, the processor of the robotic device generates a map (or spatial model) of the environment, while in other embodiments, the map is provided in the memory of the robotic device. For example, in some embodiments, the processor discovers and plots the perimeter of the environment by combining readings taken within successively overlapping fields of view using a camera. In some embodiments, an image processor (e.g., an on-board image processor) processes the captured images. In some embodiments, distance measurements are taken within successively overlapping fields of view using the camera as the robotic device moves within the environment and overlapping distance measurements are combined by the processor to plot the perimeter of the environment. In some embodiments, the processor compares the distance measurements taken within consecutive fields of view to find the overlapping area between successive images. In some embodiments, the processor determines an area of overlap between two fields of view when a number of consecutive measurements from a first field of view and a second field of view are similar. In some embodiments, the area of overlap between distance measurements taken within two fields of view is estimated based on the measured movement of the robotic device and is used as a method of verifying the identified area of overlap. It may also be used as the primary method of identifying the area of overlap. In some embodiments, devices such as an odometer, gyroscope, and optical flow sensor are used to measure movement. For example, the angular displacement provided by an odometer and gyroscope and/or the mathematical convolution of the two are used to estimate the area of overlap. In some embodiments, the processor identifies gaps in the plotted perimeter and further explores the identified gaps, directing the camera until a complete (or more complete) closed loop perimeter of the environment is plotted. In some embodiments, the robotic device starts working in the discovered environment while trying to discover new areas. Detailed examples of methods for creating a map of an environment are described in U.S. patent application Ser. Nos. 16/048,179, 16/048,185, 16/163,541, 16/163,562, 16/163,508, 16/185,000, 62/614, 449, 62/681,965, and 62/669,509, the entire contents of which are hereby incorporated by reference.

For instance, in some embodiments, the movement pattern of the robotic device during the mapping process is a boustrophedon movement pattern. This can be advantageous for mapping the environment. For example, if the robotic device begins in close proximity to a wall of which it is facing and attempts to map the environment by rotating 360 degrees in its initial position, areas close to the robotic device and those far away may not be observed by the sensors as the areas surrounding the robotic device are too close and those far away are too far. Minimum and maximum detection distances may be, for example, 30 and 400 centimeters, respectively. Instead, in some embodiments, the robotic device moves backwards (i.e., opposite the forward direction as defined below) away from the wall by some distance and the sensors observe areas of the environment that were previously too close to the sensors to be observed. The distance of backwards movement is, in some embodiments, not particularly large, it may be 40, 50, or 60 centimeters for example. In some cases, the distance backward is larger than the minimal detection distance. In some embodiments, the distance backward is more than or equal to the minimal detection distance plus some percentage of a difference between the minimal and maximal detection distances of the robot's sensor, e.g., 5%, 10%, 50%, or 80%.

The robotic device, in some embodiments, (or sensor thereon if the sensor is configured to rotate independently of the robot) then rotates 180 degrees to face towards the open space of the environment. In doing so, the sensors observe areas in front of the robotic device and within the detection range. In some embodiments, the robot does not translate between the backward movement and completion of the 180 degree turn, or in some embodiments, the turn is executed while the robot translates backward. In some embodiments, the robot completes the 180 degree turn without pausing, or in some cases, the robot may rotate partially, e.g., degrees, move less than a threshold distance (like less than 10 cm), and then complete the other 90 degrees of the turn.

References to angles should be read as encompassing angles between plus or minus 20 degrees of the listed angle, unless another tolerance is specified, e.g., some embodiments may hold such tolerances within plus or minus 15 degrees, 10 degrees, 5 degrees, or 1 degree of rotation. References to rotation may refer to rotation about a vertical axis normal to a floor or other surface on which the robot is performing a task, like cleaning, mapping, or cleaning and mapping. In some embodiments, the robot's sensor by which a workspace is mapped, at least in part, and from which the forward direction is defined, may have a field of view that is less than 360 degrees in the horizontal plane normal to the axis about which the robot rotates, e.g., less than 270 degrees, less than 180 degrees, less than 90 degrees, or less than 45 degrees. In some embodiments, mapping may be performed in a session in which more than 10%, more than 50%, or all of a room is mapped, and the session may start from a starting position, is where the presently described routines start, and may correspond to a location of a base station or may be a location to which the robot travels before starting the routine.

The robotic device, in some embodiments, then moves in a forward direction (defined as the direction in which the sensor points, e.g., the centerline of the field of view of the sensor) by some first distance allowing the sensors to observe surroundings areas within the detection range as the robot moves. The processor, in some embodiments, determines the first forward distance of the robotic device by detection of an obstacle by a sensor, such as a wall or furniture, e.g., by making contact with a contact sensor or by bringing the obstacle closer than the maximum detection distance of the robot's sensor for mapping. In some embodiments, the first forward distance is predetermined or in some embodiments the first forward distance is dynamically determined, e.g., based on data from the sensor indicating an object is within the detection distance.

The robotic device, in some embodiments, then rotates another 180 degrees and moves by some second distance in a forward direction (from the perspective of the robot), returning back towards its initial area, and in some cases, retracing its path. In some embodiments, the processor may determine the second forward travel distance by detection of an obstacle by a sensor, such moving until a wall or furniture is within range of the sensor. In some embodiments, the second forward travel distance is predetermined or dynamically determined in the manner described above. In doing so, the sensors observe any remaining undiscovered areas from the first forward distance travelled across the environment as the robotic device returns back in the opposite direction. In some embodiments, this back and forth movement described is repeated (e.g., with some amount of orthogonal offset translation between iterations, like an amount corresponding to a width of coverage of a cleaning tool of the robot, for instance less than 100% of that width, 95% of that width, 90% of that width, 50% of that width, etc.) wherein the robotic device makes two 180 degree turns separated by some distance, such that movement of the robotic device is a boustrophedon pattern, travelling back and forth across the environment. In some embodiments, the robotic device may not be initially facing a wall of which it is in close proximity with. The robotic device may begin executing the boustrophedon movement pattern from any area within the environment. In some embodiments, the robotic device performs other movement patterns besides boustrophedon alone or in combination.

In other embodiments, the boustrophedon movement pattern (or other coverage path pattern) of the robotic device during the mapping process differs. For example, in some embodiments, the robotic device is at one end of the environment, facing towards the open space. From here, the robotic device moves in a first forward direction (from the perspective of the robot as defined above) by some distance then rotates 90 degrees in a clockwise direction. The processor determines the first forward distance by which the robotic device travels forward by detection of an obstacle by a sensor, such as a wall or furniture. In some embodiments, the first forward distance is predetermined (e.g., and measured by another sensor, like an odometer or by integrating signals from an inertial measurement unit). The robotic device then moves by some distance in a second forward direction (from the perspective of the room, and which may be the same forward direction from the perspective of the robot, e.g., the direction in which its sensor points after rotating); and rotates another 90 degrees in a clockwise direction. The distance travelled after the first 90-degree rotation may not be particularly large and may be dependent on the amount of desired overlap when cleaning the surface. For example, if the distance is small (e.g., less than the width of the main brush of a robotic vacuum), as the robotic device returns back towards the area it began from, the surface being cleaned overlaps with the surface that was already cleaned. In some cases, this may be desirable. If the distance is too large (e.g., greater than the width of the main brush) some areas of the surface may not be cleaned. For example, for small robotic devices, like a robotic vacuum, the brush size typically ranges from 15-30 cm. If 50% overlap in coverage is desired using a brush with 15 cm width, the travel distance is 7.5 cm. If no overlap in coverage and no coverage of areas is missed, the travel distance is 15 cm and anything greater than 15 cm would result in coverage of area being missed. For larger commercial robotic devices brush size can be between 50-60 cm. The robotic device then moves by some third distance in forward direction back towards the area of its initial starting position, the processor determining the third forward distance by detection of an obstacle by a sensor, such as wall or furniture. In some embodiments, the third forward distance is predetermined. In some embodiments, this back and forth movement described is repeated wherein the robotic device repeatedly makes two 90-degree turns separated by some distance before travelling in the opposite direction, such that movement of the robotic device is a boustrophedon pattern, travelling back and forth across the environment. In other embodiments, the directions of rotations are opposite to what is described in this exemplary embodiment. In some embodiments, the robotic device may not be initially facing a wall of which it is in close proximity. The robotic device may begin executing the boustrophedon movement pattern from any area within the environment. In some embodiments, the robotic device performs other movement patterns besides boustrophedon alone or in combination.

In some embodiments, a camera, installed on the robotic device perceives depths from the camera to objects within a first field of view, e.g., such that a depth is perceived at each specified increment. Depending on the type of depth perceiving device used, depth may be perceived in various forms. The depth perceiving device may be a depth sensor, a camera, a camera coupled with IR illuminator, a stereo-vision camera, a depth camera, a time-of-flight camera or any other device which can infer depths from captured depth images. A depth image can be any image containing data which can be related to the distance from the depth perceiving device to objects captured in the image. For example, in one embodiment the depth perceiving device may capture depth images containing depth vectors to objects, from which the processor can calculate the Euclidean norm of each vector, representing the depth from the camera to objects within the field of view of the camera. In some instances, depth vectors originate at the depth perceiving device and are measured in a two-dimensional plane coinciding with the line of sight of the depth perceiving device. In other instances, a field of three-dimensional vectors originating at the depth perceiving device and arrayed over objects in the environment are measured. In another embodiment, the depth perceiving device infers depth of an object based on the time required for a light (e.g., broadcast by a depth-sensing time-of-flight camera) to reflect off of the object and return. In a further example, the depth perceiving device may comprise a laser light emitter and two image sensors positioned such that their fields of view overlap. Depth may be inferred by the displacement of the laser light projected from the image captured by the first image sensor to the image captured by the second image sensor (see, U.S. patent application Ser. No. 15/243,783, the entire contents of which is hereby incorporated by reference). The position of the laser light in each image may be determined by identifying pixels with high brightness (e.g., having greater than a threshold delta in intensity relative to a measure of central tendency of brightness of pixels within a threshold distance). Other depth measurement methods that may be used are described in U.S. patent application Ser. Nos. 15/954,335, 15/954,410, 15/257,798, 15/674,310, 15/224,442, and 15/683,255, the entire contents of which are hereby incorporated by reference.

In some embodiments, the robotic device and attached camera rotate to observe a second field of view partly overlapping the first field of view. In some embodiments, the robotic device and camera move as a single unit, wherein the camera is fixed to the robotic device, the robotic device having three degrees of freedom (e.g., translating horizontally in two dimensions relative to a floor and rotating about an axis normal to the floor), or as separate units in other embodiments, with the camera and robotic device having a specified degree of freedom relative to the other, both horizontally and vertically. For example, but not as a limitation (which is not to imply that other descriptions are limiting), the specified degree of freedom of a camera with a 90 degrees field of view with respect to the robotic device may be within 0-180 degrees vertically and within 0-360 degrees horizontally. Depths may be perceived to objects within a second field of view (e.g., differing from the first field of view due to a difference in camera pose). In some embodiments, the processor compares the depths for the second field of view to those of the first field of view and identifies an area of overlap when a number of consecutive depths from the first and second fields of view are similar, as determined with techniques such those described below. The area of overlap between two consecutive fields of view correlates with the angular movement of the camera (relative to a static frame of reference of a room) from one field of view to the next field of view. By ensuring the frame rate of the camera is fast enough to capture more than one frame of measurements in the time it takes the robotic device to rotate the width of the frame, there is always overlap between the measurements taken within two consecutive fields of view. The amount of overlap between frames may vary depending on the angular (and in some cases, linear) displacement of the robotic device, where a larger area of overlap is expected to provide data by which some of the present techniques generate a more accurate segment of the map relative to operations on data with less overlap. In some embodiments, the processor infers the angular disposition of the robotic device from the size of the area of overlap and uses the angular disposition to adjust odometer information to overcome the inherent noise of an odometer. Further, in some embodiments, it is not necessary that the value of overlapping depths from the first and second fields of view be the exact same for the area of overlap to be identified. It is expected that measurements will be affected by noise, resolution of the equipment taking the measurement, and other inaccuracies inherent to measurement devices. Similarities in the value of depths from the first and second fields of view can be identified when the values of the depths are within a tolerance range of one another. The area of overlap may also be identified by the processor by recognizing matching patterns among the depths from the first and second fields of view, such as a pattern of increasing and decreasing values. Once an area of overlap is identified, in some embodiments, the processor uses the area of overlap as the attachment point and attaches the two fields of view to form a larger field of view. Since the overlapping depths from the first and second fields of view within the area of overlap do not necessarily have the exact same values and a range of tolerance between their values is allowed, the processor uses the overlapping depths from the first and second fields of view to calculate new depths for the overlapping area using a moving average or another suitable mathematical convolution. This is expected to improve the accuracy of the depths as they are calculated from the combination of two separate sets of measurements. The processor uses the newly calculated depths as the depths for the overlapping area, substituting for the depths from the first and second fields of view within the area of overlap. The processor uses the new depths as ground truth values to adjust all other perceived depths outside the overlapping area. Once all depths are adjusted, a first segment of the map is complete. In other embodiments, combining depth data of two fields of view may include transforming vectors with different origins into a shared coordinate system with a shared origin, e.g., based on an amount of translation or rotation of a depth sensing device between frames, for instance, by adding a translation or rotation vector to depth vectors. The transformation may be performed before, during, or after combining. The method of using the camera to perceive depths within consecutively overlapping fields of view and the processor to identify the area of overlap and combine perceived depths at identified areas of overlap is repeated, e.g., until all areas of the environment are discovered and a map is constructed.

In some embodiments, the processor identifies (e.g., determines) an area of overlap between two fields of view when (e.g., during evaluation a plurality of candidate overlaps) a number of consecutive (e.g., adjacent in pixel space) depths from the first and second fields of view are equal or close in value. Although the value of overlapping perceived depths from the first and second fields of view may not be exactly the same, depths with similar values, to within a tolerance range of one another, can be identified (e.g., determined to correspond based on similarity of the values). Furthermore, identifying matching patterns in the value of depths perceived within the first and second fields of view can also be used in identifying the area of overlap. For example, a sudden increase then decrease in the depth values observed in both sets of measurements may be used to identify the area of overlap. Examples include applying an edge detection algorithm (like Haar or Canny) to the fields of view and aligning edges in the resulting transformed outputs. Other patterns, such as increasing values followed by constant values or constant values followed by decreasing values or any other pattern in the values of the perceived depths, can also be used to estimate the area of overlap. A Jacobian and Hessian matrix can be used to identify such similarities. In some embodiments, thresholding may be used in identifying the area of overlap wherein areas or objects of interest within an image may be identified using thresholding as different areas or objects have different ranges of pixel intensity. For example, an object captured in an image, the object having high range of intensity, can be separated from a background having low range of intensity by thresholding wherein all pixel intensities below a certain threshold are discarded or segmented, leaving only the pixels of interest. In some embodiments, a metric, such as the Szymkiewicz-Simpson coefficient, can be used to indicate how good of an overlap there is between the two sets of perceived depths. Or some embodiments may determine an overlap with a convolution. Some embodiments may implement a kernel function that determines an aggregate measure of differences (e.g., a root mean square value) between some or all of a collection of adjacent depth readings in one image relative to a portion of the other image to which the kernel function is applied. Some embodiments may then determine the convolution of this kernel function over the other image, e.g., in some cases with a stride of greater than one pixel value. Some embodiments may then select a minimum value of the convolution as an area of identified overlap that aligns the portion of the image from which the kernel function was formed with the image to which the convolution was applied.

In some embodiments, the processor expands the area of overlap to include a number of depths perceived immediately before and after (or spatially adjacent) the perceived depths within the identified overlapping area.

Depending on the type of depth perceiving device used, depth data may be perceived in various forms. In one embodiment, the depth perceiving device may measure a vector to the perceived object and calculate the Euclidean norm of each vector, representing the depth from the camera to objects within the first field of view. The LP norm is used to calculate the Euclidean norm from the vectors, mapping them to a positive scalar that represents the depth from the camera to the observed object. In some embodiments, this data structure maps the depth vector to a feature descriptor to improve frame stitching, as described, for example, in U.S. patent application Ser. No. 15/954,410, the entire contents of which are hereby incorporated by reference. In some embodiments, the depth perceiving device may infer depth of an object based on the time required for a light to reflect off of the object and return. In a further example, depth to objects may be inferred using the quality of pixels, such as brightness, intensity, and color, in captured images of the objects, and in some cases, parallax and scaling differences between images captured at different camera poses. It is noted that each step taken in the process of transforming a matrix of pixels, for example, each having a tensor of color, intensity and brightness, into a depth value in millimeters or inches is a loss and computationally expensive compression and further reduces the state space in each step when digitizing each quality. In order to reduce the loss and computational expenses, it is desired and useful to omit intermediary steps if the goal can be accomplished without them. Based on information theory principal, it is beneficial to increase content for a given number of bits. For example, reporting depth in specific formats, such as metric units, is only necessary for human visualization. In implementation, such steps can be avoided to save computational expense and loss of information. The amount of compression and the amount of information captured and processed is a trade-off, which a person of ordinary skill in the art can balance to get the desired result with the benefit of this disclosure.

Structure of data used in inferring depths may have various forms. For example, a matrix containing pixel position, color, brightness, and intensity or a finite ordered list containing x, y position and norm of vectors measured from the camera to objects in a two-dimensional plane or a list containing time-of-flight of light signals emitted in a two-dimensional plane between camera and objects in the environment. For ease of visualization, data from which depth is inferred may be converted and reported in the format of millimeters or inches of depth; however, this is not a requirement, which is not to suggest that other described features are required. For example, pixel intensities from which depth may be inferred may be converted into meters of depth for ease of visualization, or they may be used directly given that the relation between pixel intensity and depth is known. To reduce computational expense, the extra step of converting data from which depth may be inferred into a specific format can be eliminated, which is not to suggest that any other feature here may not also be omitted in some embodiments. The methods of perceiving or otherwise inferring depths and the formats of reporting depths used herein are for illustrative purposes and are not intended to limit the invention, again which is not to suggest that other descriptions are limiting. Depths may be perceived (e.g., measured or otherwise inferred) in any form and be reported in any format.

Due to measurement noise, discrepancies between the value of depths within the area of overlap from the first field of view and the second field of view may exist and the values of the overlapping depths may not be the exact same. In such cases, new depths may be calculated, or some of the depths may be selected as more accurate than others. For example, the overlapping depths from the first field of view and the second field of view (or more fields of view where more images overlap, like more than three, more than five, or more than 10) may be combined using a moving average (or some other measure of central tendency may be applied, like a median or mode) and adopted as the new depths for the area of overlap. The minimum sum of errors may also be used to adjust and calculate new depths for the overlapping area to compensate for the lack of precision between overlapping depths perceived within the first and second fields of view. By way of further example, the minimum mean squared error may be used to provide a more precise estimate of depths within the overlapping area. Other mathematical methods may also be used to further process the depths within the area of overlap, such as split and merge algorithm, incremental algorithm, Hough Transform, line regression, Random Sample Consensus, Expectation-Maximization algorithm, or curve fitting, for example, to estimate more realistic depths given the overlapping depths perceived within the first and second fields of view. The calculated depths are used as the new depths for the overlapping area. In another embodiment, the k-nearest neighbors algorithm can be used where each new depth is calculated as the average of the values of its k-nearest neighbors. Some embodiments may implement DB-SCAN on depths and related values like pixel intensity, e.g., in a vector space that includes both depths and pixel intensities corresponding to those depths, to determine a plurality of clusters, each corresponding to depth measurements of the same feature of an object. In some embodiments, a first set of readings is fixed and used as a reference while the second set of readings, overlapping with the first set of readings, is transformed to match the fixed reference.

FIG. 1 illustrates a flowchart describing an example of a method for generating a map of the environment, the method including steps 100, 101, and 102.

The robotic device may, for example, use the map to autonomously navigate the environment during operation, e.g., accessing the map to determine that a candidate route is blocked by an obstacle denoted in the map, to select a route with a route-finding algorithm from a current point to a target point, or the like. In some embodiments, the map is stored in memory for future use. Storage of the map may be in temporary memory such that a stored map is only available during an operational session or in more permanent forms of memory such that the map is available at the next session or startup. In some embodiments, the map is further processed to identify rooms and other segments. In some embodiments, a new map is constructed at each use, or an extant map is updated based on newly acquired data Some embodiments may reference previous maps during subsequent mapping operations. For example, embodiments may apply Bayesian techniques to simultaneous localization and mapping and update priors in existing maps based on mapping measurements taken in subsequent sessions. In some embodiments, the processor of the robotic device localizes itself during mapping or during operation using robot localization methods such as those described below and in U.S. Patent Application Nos. 62/746,688, 62/665,095, 62/674,994, 62/688,497 16/297,508, 62/740,573, 62/740,580, 15/955,480, 15/425,130, and 15/955,344 the entire contents of which are hereby incorporated by reference.

In some embodiments, the processor determines its actions (e.g., for a robotic cleaner, which cleaning tools to use) based on characteristics of the environment using methods similar to those described in U.S. patent application Ser. Nos. 16/239,410 and 16/163,530, the entire contents of which are hereby incorporated by reference. For example, some of the embodiments provide an autonomous robotic cleaning device with at least one processor and a debris sensor. The term "debris" or "dirt" or "particle" may be defined generally to include any unwanted matter such as, including but not limited to, crumbs, dust, hair, dirt, soil, refuse, trash, debris, particles, feces, liquids, items, grass, pebbles, rocks, wood, glass, and the like that may be cleaned or collected off of a work surface by a mobile robotic device or its equivalent. In some embodiments, the debris sensor detects the amount of debris collected. In some embodiments, the processor uses the data from the debris sensor of the robotic cleaning device to determine which areas of an environment have a higher likelihood of accumulating debris. In some embodiments, the processor associates a location of the robotic device with each reading of the debris sensor to determine to which area of the environment the data belongs. In some embodiments, the debris sensor has its own processor and associates a location of the robotic device with each reading of the debris sensor. In some embodiments, other information is associated with each debris sensor reading, such as date, time and type of debris (e.g., hair, food, dust, etc.). In some embodiments, associates information to only a portion of the sensor readings. In some embodiments, the processor instructs the robotic cleaning device to perform cleaning in areas with higher levels of debris accumulation more frequently. In some embodiments, the frequency is proportional to the level of debris accumulation. In some embodiments, the processor stores all or a portion of the debris sensor data and all or a portion of any other data associated with the debris sensor data in a memory of the robotic device. In some embodiments, the processor uses the stored data for optimizing cleaning of the environment by performing cleaning functions according to the needs of different areas.

In some embodiments, the debris sensor is coupled to one of the processors of the robotic device and the processor of the robotic device processes the sensor data. In other embodiments, the debris sensor includes its own processor for processing the sensor data. In some embodiments, the debris sensor approximates the amount of debris collected (e.g., over time or over an area) and the processor uses the data to estimate levels of debris accumulation for different areas of the environment. In some embodiments, optical sensors (like light sensors, laser sensors, and IR sensors) and/or capacitive sensors and/or acoustic sensors and/or weight sensor and/or piezoelectric sensors may be used for detecting debris, estimating the amount of debris collected (e.g., over time or over an area) and/or the type of debris collected. In some embodiments, the processor of the robotic device monitors a signal intensity received from a capacitance sensor to detect when debris is collected, approximate the amount of debris collected (e.g. over time or over an area) and/or determine the type of debris collected (e.g., liquid, solid food, etc.). In other embodiments, the processor monitors the amount of light received by a light emitting optical sensor placed at a debris intake area of the robotic device to detect when debris is collected, approximate the amount of debris collected (e.g. over time or over an area) and/or determine the type of debris collected (e.g., liquid, solid food, etc.) as the amount of light received reduces with increasing amount of debris blocking the light. In other cases, the processor uses data from an IR proximity sensor aimed at the surface as different surfaces (e.g. clean hardwood floor, dirty hardwood floor with thick layer of dust) have different reflectance thereby producing different signal output. In some instances, the processor uses data from a weight sensor of a dustbin to detect debris and estimate the amount of debris collected. In other instances, the processor uses data from an acoustic sensor to detect debris and/or determine the type of debris. For example, the processor differentiates between the acoustic signal of large solid particles, small solid particles or air to determine the type of debris and based on the duration of different acoustic signals identifies areas with greater amount of debris accumulation. In some instances, a piezoelectric sensor is placed within a debris intake area of the robotic device such that debris may make contact with the sensor. The processor uses the piezoelectric sensor data to detect the amount of debris collected and type of debris based on the magnitude and duration of force measured by the sensor. In some embodiments, a camera captures images of a debris intake area of the robotic vacuum and the processor analyzes the images to detect debris, approximate the amount of debris collected (e.g. over time or over an area) and determine the type of debris collected. In some embodiments, an IR illuminator projects a pattern of dots or lines onto an object within the field of view of the camera. The camera captures images of the projected pattern, the pattern being distorted in different ways depending the amount and type of debris collected. The processor analyzes the images to detect when debris is collected and to estimate the amount and type of debris collected.

In some embodiments, a memory of the robotic device contains an internal database of types of debris likely to be encountered within the environment. In some embodiments, the processor identifies the type of debris collected in the environment by using the data of various sensors capturing the features of the debris (e.g., camera, pressure sensor, acoustic sensor, etc.) and comparing those features with features of different types of debris stored in the internal database. In some embodiments, the processor of the robotic device determines the likelihood of collecting a particular type of debris in different areas of the environment based on, for example, current and historical data. For example, a robotic device encounters accumulated dog hair on the surface. Image sensors of the robotic device capture images of the debris and the processor analyzes the images to determine features of the debris. The processor compares the features to those of different types of debris within the internal database and matches them to dog hair. The processor of the robotic device marks the region in which the dog hair was encountered within a map of the environment as a region with increased likelihood of encountering dog hair. The processor increases the likelihood of encountering dog hair in that particular region with increasing number of occurrences. In some embodiments, the processor further determines if the type of debris encountered can be cleaned by a cleaning function of the robotic device. For example, a processor of a robotic vacuum determines that the debris encountered is a liquid and that the robotic device does not have the capabilities of cleaning the debris. In some embodiments, the processor of the robotic device incapable of cleaning the particular type of debris identified communicates with, for example, a control system or another robotic device capable of cleaning the debris from the environment.

In embodiments, the processor of the robotic device marks the level of debris accumulation expected in different areas of the environment within a map of the environment based on, for example, current and historical data (e.g. sensor data, cleaning history, etc.). In some embodiments, the processor adjusts the level of debris marked within different areas of the map of the environment based on historical data on debris accumulation in that particular areas and/or cleaning history of particular areas (e.g., last time an area was cleaned). In some embodiments, the processor of the robotic device marks the type of debris expected in different areas of the environment within a map of the environment based on, for example, current and historical data (e.g. sensor data, cleaning history, etc.). In some embodiments, the processor determines the likelihood of an area having different levels of debris accumulation (e.g., the likelihood of a particular area having low, medium and high debris accumulation). In some embodiments, the likelihood is adjusted based on cleaning history. For example, if an area with high likelihood of having a high level of debris accumulation was just cleaned, the processor reduces the likelihood of having a high level of debris accumulation and increases the likelihood of having a low level of debris accumulation.

In some embodiments, the processor of the robotic device stores all or a portion of the data relating to debris accumulation collected and/or processed by the processor of the robotic device or processor of other robotic devices operating within the same environment in the memory of the robotic device. In some embodiments, the processor of the robotic device determines a path and/or the order of areas to be cleaned and/or cleaning schedule and/or other instructions of the robotic device based on the estimated levels of debris accumulation in different areas of the environment determined from all or a portion of the data relating to debris accumulation. For example, the processor determines a cleaning path that provides prioritization to areas with high debris accumulation. For instance, the processor of the robotic device prioritizes cleaning a kitchen over a sitting room when planning a cleaning session and navigational route if data suggests that food particles are routinely encountered in the kitchen while the sitting room routinely has a low level of debris accumulation. This improves cleaning efficiency as areas with high levels of debris accumulation are identified and prioritized for cleaning over those with low levels of debris accumulation. In some embodiments, the processor prioritizes areas based on the type of debris. For example, the processor of the robotic device prioritizes cleaning a kitchen with high level of debris accumulation, the debris type being food, over a sitting room with high level of debris accumulation, the debris type being dust. It is more important that larger, visible, unsanitary debris be cleaned prior to smaller, invisible debris.

In some embodiments, the processor or a user sets a cleaning schedule for the robotic device. In instances wherein the cleaning time of the robotic device is limited, the processor of the robotic device prioritizes cleaning areas with higher levels of accumulated debris. For example, the processor prioritizes highly used areas such as, the kitchen, bathroom, and bedrooms, with high levels of daily debris accumulation before cleaning other rooms with lower levels of debris accumulation. In some embodiments, the processor of the robotic device determines the cleaning schedule based on the level of dust accumulation in different areas of the environment. For example, the processor of the robotic device schedules daily cleaning of the kitchen, bathrooms, and bedrooms, with high levels of dust accumulation, while scheduling cleaning of other rooms once a week. In some embodiments, the processor of the robotic device marks areas it has cleaned during each cleaning session. In some instances, the processor stores other information, such as, cleaning time, repeat coverage, date and time of cleaning an area, the number of times an area is cleaned, and the like, in the memory of the robotic device. In some embodiments, the processor uses such information to adjust the estimated level of dust accumulation or likelihood of different levels of dust accumulation in a particular area of the environment.

In some embodiments, the processor of the robotic device alters the function of the robotic device based on the estimated level of dust accumulation or likelihood of different levels of dust accumulation in different areas of the environment. For example, the processor of the robotic device increases the speed of the robotic device in areas likely to have no or low levels of debris accumulation while decreasing the speed in areas likely to have high levels of debris accumulation to more carefully clean the area. In another example, the processor of the robotic device increases the speed of the impeller or main brush of the robotic device in areas likely to have no or low levels of debris accumulation while decreasing the speed of the impellor or main brush in areas likely to have high levels of debris accumulation to more thoroughly clean the area.

In some embodiments, the levels of debris accumulation referred to are expected levels of debris accumulation based on current and historical data (e.g., debris sensor data, image sensor data, obstacle sensor data, movement sensor data, cleaning data, etc.). In some embodiments, each level is assigned a likelihood of being true for different areas within the environment. In some embodiments, the levels are categories while in other embodiments, the level of dust accumulation is an exact number or is assigned to a numerical range.

In some embodiments, the processor of the robotic device generates a map of the environment. In some embodiments, the processor of the robotic device generates a new map at each cleaning session. In some embodiments, the processor compiles maps generated during prior cleaning sessions. In some embodiments, the compiled map generates a comprehensive map of all the maps previously generated. In some embodiments, the map contains data relating to the environment. In some embodiments, the map includes information such as, likelihood of different levels of dust accumulation in different locations of the environment, the likelihood of encountering different types of debris in different locations of the environment, the frequency of encountering a particular level of debris accumulation and/or type of debris in different locations, and the date and/or time of encountering a particular level of debris accumulation and/or type of debris in different locations. In some embodiments, the processor uses the information in generating the cleaning path of the robotic device.

In some embodiments, the map of the environment is a grid map wherein the map is divided into cells, each cell representing a different area or location within the environment. In some embodiments, the debris sensor collects data as the robotic device navigates throughout the environment or operates within the environment. In some embodiments, the processor associates each or a portion of the debris sensor readings with the particular cell (or location) of the robotic device when the particular reading was taken. In some embodiments, the robotic device continues to cover the surface of the environment until data from the debris sensor is collected for each or a select number of cells of the grid map. In some embodiments, the processor associates debris data obtained from a control system or another robotic device with all or a portion of the cells of the grid map. In some embodiments, the debris sensor data associated with cells of the grid map indicate the presence or absence of debris within the particular cell while in other embodiments, the debris sensor data associated with cells of the grid map indicate a level of debris accumulation as described above. In some embodiments, the processor associates additional information with cells of the grid map. For example, for a single debris sensor reading of a cell, additional information such as, date and time of the debris reading, the amount of debris collected, the size of debris collected, the type of debris collected, and the like, may be associated with the cell as well. Further, in some instances, information such as, the likelihood of the cell having a particular level of dust accumulation, type of debris, and/or size of debris, is associated with cells of the grid map.

In some embodiments, the processor of the robotic device generates a new grid map with a new debris-related information associated with each or a portion of the cells of the grid map at each work session. In some embodiments, the processor compiles the map generated at the end of a work session with an aggregate map comprised of a combination of maps generated during each or a portion of prior work sessions. In some embodiments, the processor directly integrates data collected during a work session into the aggregate map either after the work session or in real-time as data is collected. In some embodiments, the likelihood of different levels of debris accumulation and/or encountering a particular type and/or size of debris associated with a cell of the aggregate map is based on debris sensor data or other data collected during prior work sessions. In some embodiments, the processor updates the aggregate map after each work session. In some embodiments, information pertaining to, for example, obstacles, work surface types, hazards, and the like are associated with cells of the map.

In some embodiments, the processor of the robotic device uses information from the aggregate map when determining a cleaning path and/or work functions (or actions) and/or settings of the robotic device. Work functions (or actions) may include, but are not limited to, vacuuming, sweeping, mopping, UV treatment, etc. Settings may include, but are not limited to, speed of the robotic device, speed of brushes, speed of impeller, cleaning schedule, cleaning plan (e.g., which areas to clean), etc. For example, the processor of the robotic device determines the cleaning path based on debris accumulation data of the aggregate map such that the cleaning path first covers areas with high likelihood of high levels of debris accumulation, then covers areas with high likelihood of low levels of debris accumulation. In another example, the processor of the robotic device determines the impeller speed based on debris size data of the aggregate map such that higher impeller speeds are used in areas with high likelihood of large sized debris and lower speeds are used in areas with high likelihood of small sized debris. In another example, the processor of the robotic devices chooses when to use UV treatment based on debris type data of the aggregate map such that areas with high likelihood of having debris that can cause sanitary issues, such as food, receive UV treatment. In some embodiments, the processor of the robotic device considers additional factors when determining a cleaning path and/or work functions (or actions) and/or settings of the robotic device. For example, factors relating to obstacles or hazards in the environment, user preferences, work surface type, cleaning history, and the like may be considered. For instance, the processor of the robotic device increases the speed of the robotic device on hard wood floor or increases the speed of the impeller on carpet.

In some embodiments, the robotic device is a robotic cleaner and comprises a main brush and a peripheral brush. In some embodiments, the peripheral brush of the robotic cleaner includes one or more arms (three are shown) to which bristles are securely attached such that bristles remain in place when pulled and/or at risk of being plucked from the one or more arms of the peripheral brush. In some embodiments, the arms are hollowed tubes. In some embodiments, the bristles are secured to the one or more arms of the peripheral brush using stitching. In some embodiments, the bristles are bundled together and securely stitched to the one or more arms, forming one or more compact and firm brushes that result in more effective sweeping of debris as bristles are not lost over time and the brush maintains its fullness. In some embodiments, the secure stitching of bristles to the one or more arms of the peripheral brush avoid the bristles from being forcibly plucked during operation when, for example, the bristles become entangled with or caught up with an obstruction (e.g. cable, hair, or carpet) or make contact with a sticky substance or become lodged between objects and the robotic cleaner or when the peripheral brush continues or attempts to continue to rotate when entangled with an obstruction.

In some embodiments, the stitching technique used to stitch the bristles together and/or to the one or more arms of the peripheral brush can vary. For example, stitching the bristles together can include stitching across the bundle of bristles in a straight line in a direction perpendicular to the length of the bristles. In another example, stitching the bristles together can include stitching diagonally across the bristles in two directions. In other instances, other stitching techniques can be used, such as stitching in a crisscross pattern. In some embodiments only one type of stitching technique is used while in other embodiments more than one type of stitching technique is used. In some embodiments, a stitching technique is repeated multiple times. For example, multiple parallel stitching lines along an end of the bundle directed perpendicular to the length of the bristles can be used to increase the fastening strength of the bristles to one another. In some embodiments, the bristles are stitched together and then stitched to the one or more arms of the peripheral brush. In some embodiments, the one or more arms of the peripheral brush include small openings through which the stitching material can be weaved in order to stitch the bristles to the one or more arms.

In some embodiments, the robotic device uses the processor and one or more environmental sensors (e.g., sensors that sense attributes or can observe or provide data from which inferences can be made about characteristics of an environment, such as those of a floor, a wall, or a surface of an obstacle). Examples of sensors include, but are not limited to, floor sensors, debris sensors, obstacle sensors, cliff sensors, acoustic sensors, cameras, optical sensors, distance sensors, motion sensors, tactile sensors, electrical current sensors, and the like. Sensors may sense various attributes of one or more of these features of an environment, e.g., particulate density, rolling resistance experienced by robot wheels, hardness, location, carpet depth, sliding friction experienced by robot brushes, hardness, color, acoustic reflectivity, optical reflectivity, planarity, acoustic response of a surface to a brush, and the like. In some embodiments, the sensor takes readings of the environment and the processor obtains the sensor data. In some embodiments, the sensed data is associated with location data of the robotic device indicating the location of the robotic device at the time the sensor data was obtained. In some embodiments, the processor infers environmental characteristics from the sensory data. In some embodiments, the processor adjusts various operating parameters of actuators, like speed, torque, duty cycle, frequency, slew rate, flow rate, pressure drop, temperature, brush height above the floor, or second or third order time derivatives of the same. For instance, some embodiments adjust the speed of components (e.g., main brush, peripheral brush, wheel, impeller, etc.) based on the environmental characteristics inferred. In some embodiments, the processor activates or deactivates (or modulates intensity of) functions (e.g., vacuuming, mopping, UV, mowing, plowing, etc.) based on the environmental characteristics inferred. In other instances, the processor adjusts a movement path, operational schedule (e.g., time when various designated areas are worked upon, such as when cleaned), and the like based on sensory data. Examples of environmental characteristics include floor type, obstacle density, activity level, room type, level of debris accumulation, level of user activity, time of user activity, etc.

In some embodiments, the processor of the robotic device determines a movement path of the robotic device based on the map of the environment. For example, in some embodiments, the robotic device is configured to implement a path planning method that is responsive to stimulus from an observed environment using the processor of the robotic device. Some embodiments segment a working environment into regions and then dynamically adjust a coverage pattern within each of those regions abased on sensed attributes of the environment. In some embodiments, a topological graph represents the route plan of the robotic device and is described with a set of vertices and edges, the vertices being linked by edges. Vertices may be represented as distinct points while edges may be lines, arcs or curves. The properties of each vertex and edge may be provided as arguments at run-time based on real-time sensory input of the environment. The topological graph may define the next actions of the robotic device as it follows along edges linked at vertices. While executing the movement path, in some embodiments, rewards may be assigned as the robotic device takes actions to transition between states and uses the net cumulative reward to evaluate a particular movement path comprised of actions and states. The processor may iteratively calculate a state-action value function during execution of the movement path based on the current reward and maximum future reward at the next state. One goal is to find optimal state-action value function and optimal policy by identifying the highest valued action for each state. As different topological graphs including vertices and edges with different properties are executed over time, the number of states experienced, actions taken from each state, and transitions increase. The path devised by the processor of the robotic device iteratively evolves to become more efficient by choosing transitions that result in most favorable outcomes and by avoiding situations that previously resulted in low net reward. After convergence, the evolved movement path is determined to be more efficient than alternate paths that may be devised using real-time sensory input of the working environment. Detailed examples of path planning methods are described in U.S. patent application Ser. Nos. 16/041,286, 15/406,890, 14/673,633,14/817,952, and 16/198,393, the entire contents of which are hereby incorporated by reference.

Figure 2:
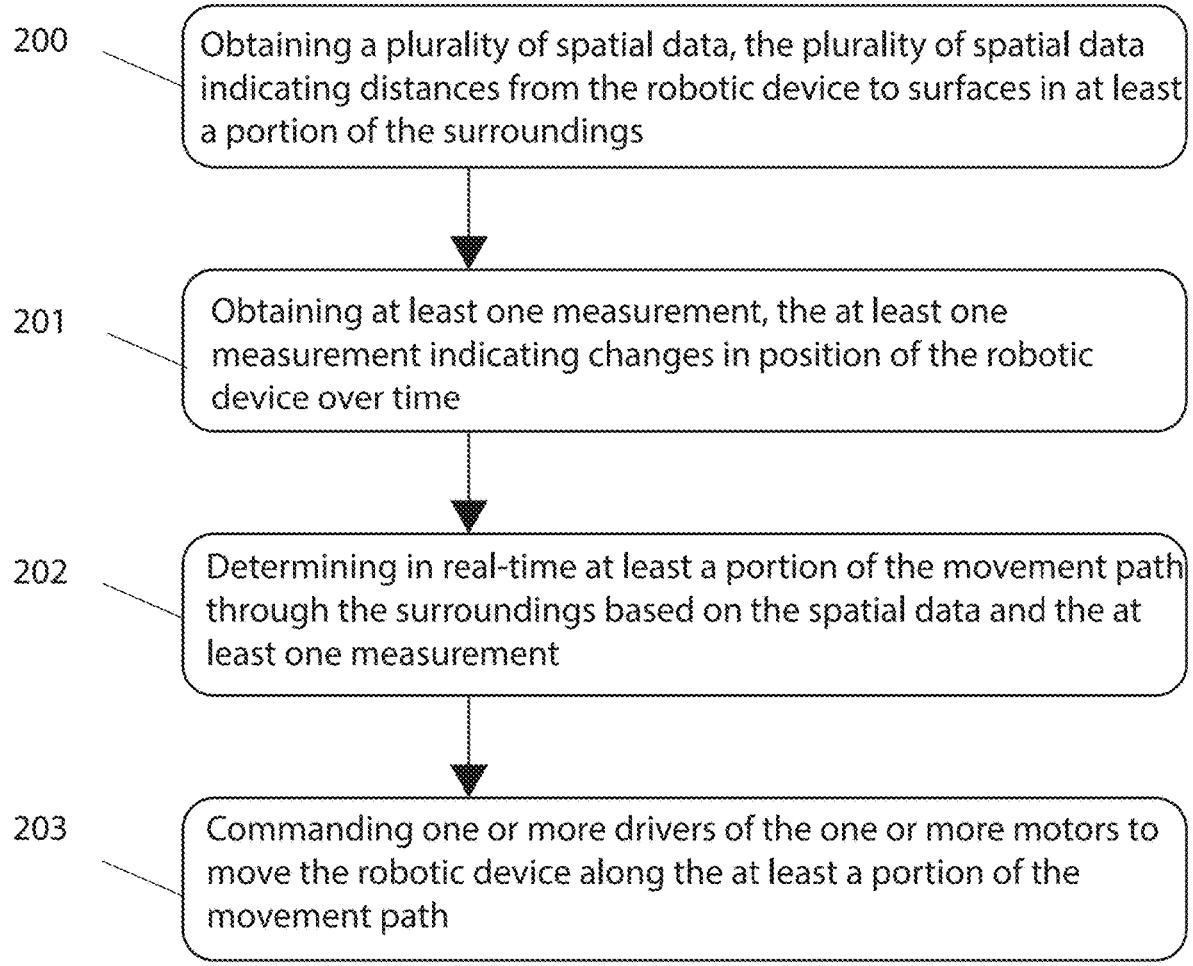
FIG. 2 illustrates a flowchart describing an example of a method for generating a movement path of a robotic device, according to some embodiments.

FIG. 2 illustrates a flowchart describing an example of a method for generating a movement path of a robotic device, the method including steps 200, 201, 202, and 203.

In some embodiments, the processor divides the environment into subareas and orders them for cleaning to improve cleaning efficiency. In some embodiments, the robotic device finishes cleaning in one subarea before cleaning another subarea. For example, in some embodiments, the processor divides the map into a plurality of cells wherein each cell corresponds to an area of the environment. In some embodiments, the processor segments the map into a plurality of zones, each zone having a subset of the plurality of cells. In some embodiments, the processor determines a sequence of the zones among a plurality of candidate sequences based on an effect of the sequence on a cost of a cost function that is based on travel distance of the robotic device through the sequence. In some embodiments, the robotic device traverses the zones in the determined sequence. In some embodiments, the cost function is based on other variables, such as actual surface coverage, repeat coverage, and total coverage time.

In some embodiments, the processor represents the map of a workspace by a plurality of cells, each cell representing a different location of the workspace. In some embodiments, each cell is defined by an ordered pair representing an angle and a distance from an origin of a coordinate system. In some embodiments, each cell of the workspace can only belong to a single zone and overlap between zones is avoided by construction. In some embodiments, entries in the matrices of zones have a value of zero if cell is empty or a value of one if the cell is occupied by a wall or furniture. In some embodiments, the processor executes the following iteration for each zone of a sequence of zones, beginning with the first zone to optimize division of zones: expansion of the zone if neighbor cells are empty, movement of the robotic device to a point in the zone closest to the current position of the robotic device, addition of a new zone coinciding with the travel path of the robotic device from its current position to a point in the zone closest to the robotic device if the length of travel from its current position is significant, execution of a surface coverage pattern within the zone, and removal of any uncovered cells from the zone.

In another embodiment, the processor determines an optimal surface coverage plan by minimizing a cost function. In some embodiments, the cost function depends on distance travelled between zones, coverage, and coverage time. In some embodiments, the cost function is minimized by removing, adding, shrinking, expanding, moving and switching the order of coverage of zones. In some embodiments, the processor uses gradient descent to compute the division of zones that results in minimal cost by iteratively modifying division of zones based on a partial derivative of the cost function with respect to each respective parameter defining the zones. This is repeated until the cost is below a predetermined threshold.

In yet another embodiment, the processor determines optimal division of zones by modeling zones as emulsions of liquid. Behaviors of emulsions of liquid, such as minimization of surface tension and surface area and expansion and contraction of the emulsion driven by an internal pressure are used by the processor in modeling the zones. In some embodiments, the processor represents the workspace by a grid map divided into zones. In some embodiments, the grid map is converted into a routing graph consisting of nodes connected by edges. A zone is represented by a set of nodes. The nodes are connected and represent an area on the grid map. A zone is assigned a set of boundary edges wherein a boundary edge connects two nodes. The set of boundary edges define the set of boundary nodes and give information about which are just inside and outside a zone. In some embodiments, a zone can be expanded or reduce by adding or removing nodes. In some embodiments, the processor computes a numerical value assigned to each node. In some embodiments, the value of each node indicates whether to add or remove the node from a zone. In some embodiments, the numerical value computed is dependent on growth and decay of the zone, distance of the node from the center of the zone, order of zone coverage, and a surface smoother score. In some embodiments, the processor computes an order score for each node to determine order of coverage based on the distance between the boundary node of interest and the closest boundary node in the next zone to be covered, the distance between the closest boundary nodes between the current zone and the next zone to be covered, and the distance between the furthest boundary nodes between the current zone and the next zone to be covered. Further details of methods for dividing an environment into subareas are described in U.S. patent application Ser. Nos. 14/817,952, 16/198,393, and 62/740,558, the entire contents of which are hereby incorporated by reference.

In some embodiments, the processor localizes the robotic device. In some embodiments, methods of localization are inherently independent from mapping and path planning but may be used in tandem with any mapping or path planning method or may be used independently to localize the robotic device irrespective of the path or map of the environment. In some embodiments, the motion of the robotic device is described mathematically by Newton's motion equation:

$$F = m\frac{d^2x}{dt^2}$$

where F is the force causing the robotic device to move, m is the mass of the robotic device, x is the position of the robotic device, t is time and d signifies the derivative. In some embodiments, the motion of the robotic device is also described by:

$$F = -\frac{\partial V}{\partial x}$$

where V is potential energy causing motion of the robotic device and @ signifies a partial derivative. In some embodiments, the two equations describing the motion of the robotic device are combined to form a motion function that is used to determine the position of the robotic device at a given time.

$$m\frac{d^2x}{dt^2} = -\frac{\partial V}{\partial x}$$

The above equation is in accordance with Newton's Second Law. Given the position of the mass at any given time x(t), the velocity $$\left(v = \frac{dx}{dt}\right),$$

momentum (p=mv), kinetic energy $$\left(T = \frac{1}{2}mv^2\right)$$

among other dynamic variables can be determined. Given the initial state variables, i.e. the position $x(t_0)$ and velocity $x'(t_0)$ of a particle, the trajectory of the particle can be calculated. Using the initial position and velocity, the position x at a later time $(t_0+\Delta t)$ is calculated using the equation below. The equation holds true if the velocity is constant in the time interval $[t_0, t_0+\Delta t]$, otherwise it is an approximation.

$$x(t_0+\Delta t)=x(t_0)+x'(t_0)\Delta t$$

In some embodiments, this process is iteratively repeated to calculate the trajectory at time $(t_0+2\Delta t)$ and so on. With the motion function being second order in time, x $(t_0)$ and $x'(t_0)$, are required to specify a trajectory. This is equivalent to identifying two space-time points $(x_i, t_i)$ and $(x_f, t_f)$.

Rather than consider a single position x, a processor of the robotic device generalizes to n-dimensions $(x_1, x_2, \ldots, x_n)$ such that the spatial configuration of the system is represented as a point in an n-dimensional configuration space, otherwise known as a Hilbert Space. In some embodiments, the processor generalizes the motion equation:

$$m_j \frac{d^2 x_j}{dr^2} = -\frac{\partial V}{\partial x_j}$$

In some embodiments, the processor integrates the motion equation to determine the trajectory of the robotic device. Since the trajectory equation applies for all possible paths, a function dependent on not only the position x at time t but also on the path is required. In practice, the robotic device may take any possible path. In some embodiments, the processor uses the Lagrangian function to predict such trajectory as it is a function of position, velocity, and time, and equal to the difference in kinetic energy and potential energy. In some embodiments, the processor defines an action $S[x(t)]$ for each path from $(x_i, t_i)$ to $(x_f, t_f)$,:

$$S[x(t)] = \int_{t_i}^{t_f} L(x_i, x_f) dt$$

In some embodiments, the processor represents all possible locations resulting from possible actions S (or paths) or the action space by a field $|\Psi(x, t)|^2$.

By definition, a field is a physical quantity represented by a number or tensor that has a value for each point in space and time. For example, the surface wind velocity on a weather map can be considered a field since a vector describing the speed and direction of the movement of air is assigned to each point on the map for each time point t. In another example, surface temperature on the planet can be considered a field as a surface temperature exists for each point on the planet at a given time. In the case of the robotic device, the field $|\Psi(x, t)|^2$ describes the likelihood of possible locations of the robotic device at time t in some embodiments.

Given that the field $|\Psi(x, t)|^2$ describes the likelihood of possible locations of the robotic device at time t, in some embodiments, the processor determines the likelihood of the location of the robotic device being between two points a and b at a time t using the integral of $|\Psi(x, t)|^2$ from a to b.

$$\int_a^b |\Psi(x, t)|^2 dx$$

In some embodiments, the processor normalizes the function $|\Psi(x, t)|^2$ by multiplying by a value $c=1/\sqrt{A}$, where A is a potential value other than 1. By normalizing, the above integral becomes equal to unity.

$$\int_a^b |\Psi(x, t)|^2 dx = 1$$

In some embodiments, the integral above represents the probability of x having a value between a and b at a given time t since the area bound in the integral summates to 1. In some embodiments, the normalized function $|\Psi(x, t)|^2$ represents a probability density function (PDF) and the processor determines the probability of the robotic device being located at a particular location by determining the integral of the PDF.

$$\int_a^b |\Psi(x, t)|^2 dx = P(a < x < b, t)$$

Since $|\Psi(x, t)|^2$ is a linear differential equation that can be normalized, the processor can determine the expectation of the location x of the robotic device in some embodiments.

$$\langle x \rangle = \int_{-\infty}^{\infty} x |\Psi(x, t)|^2 dx$$

Additionally, since $$v = \frac{dx}{dt},$$

the processor can calculate the expected value of velocity of the robotic device in some embodiments, where v is velocity.

$$\langle v \rangle = \frac{d\langle x \rangle}{dt} = \frac{d}{dt} \int_{-\infty}^{\infty} x |\Psi(x, t)|^2 dx$$

In some embodiments, the localization process begins by taking measurements of the surroundings using one or more sensors of the robotic device, which include objects, obstacles, and perimeters among other materials and substances. Measurements may be of various forms. For example, measurements may be visual measurements captured by an image sensor, distance measurements taken by a distance sensor, time-of-flight measurements taken by a time-of-flight camera, WI-FI signal strength measurements taken by a WI-FI module or decibel measurements observed by an acoustic sensor. Other types of measurements may also be used. Different types of measurements may be used independently or simultaneously for localization purposes. In some embodiments, when a measurement is taken by at least one sensor of the robotic device, the processor infers a position x of the robotic device in a global coordinate system at time t of the measurement, thereby localizing the robotic device. In some embodiments, the location is represented by $x=(x, y, \theta)$ in two dimensions, and in three dimensions the location is represented by $x=(x, y, z)$ and $\theta=(R_x, R_y, R_z)$ where R is a rotation matrix.

Regardless of the method used for localization and the type of sensor or measurement device, in some embodiments, localization of the robotic device occurs at the time of measurement and is represented by a position x with respect to the surroundings, such as objects, obstacles or perimeters within the surroundings. For example, if a measurement device of the robotic device measures distance to an object, the instant the measurement is taken the processor, for example, localizes the robotic device to be at some position x with respect to the object measured. If the measurement device measures noise in decibels, for instance, the processor localizes the robotic device as being at some position x from the originator of the noise. If the measurement device measures WI-FI strength, by way of further example, the processor localizes the robotic device as being at some position x from the originating point of the WI-FI signal.

In some embodiments, the processor of the robotic device may receive, send, and process data and commands, such as operation modes. The processor may perform, for example, methods for receiving, storing, and sending data; methods for processing data, including depth data and visual data; methods for processing command responses to received, stored or processed data, to the observed environment, to internal observation, or to user input; and methods for navigation and other operation modes. For example, the processor may receive data from an obstacle sensor and after processing the data received may respond by commanding the robotic device to move in a specific direction. In some embodiments, the robotic device includes a localization module for localizing the robotic device. In some embodiments, the localization module includes, but is not limited to include, memory for storing data, a processor for receiving, sending, and processing data and commands, such as operation modes and an interfacing unit to interface with other components of the robotic device, such as mapping or path planning modules. The localization module may be a part of the robotic device or any other device or module of the robotic device or may be a standalone system. The localization module may also include a separate component coupled to the robotic device, the navigation system, the mapping module, the camera, or other devices working in conjunction with the robotic device.

Figure 3:
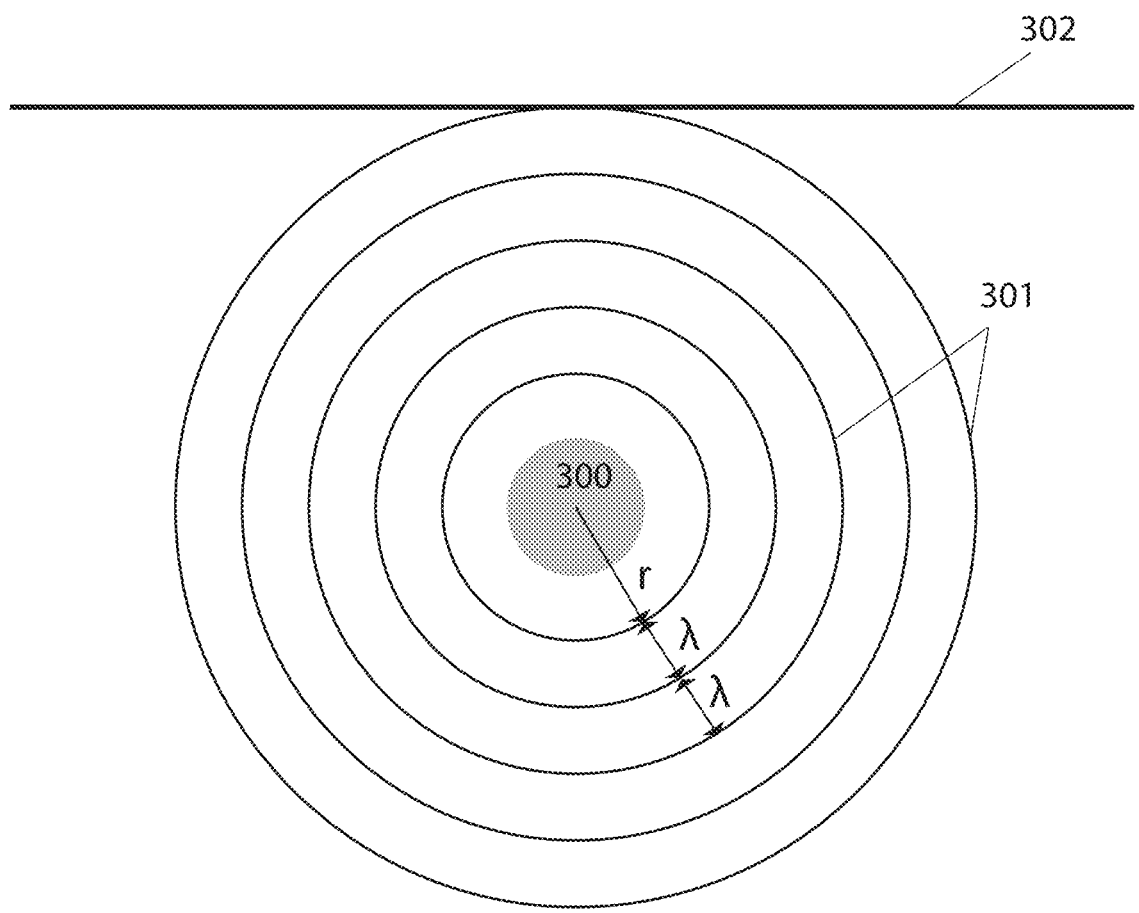
FIG. 3 illustrates an embodiment wherein at least one sensory device of a robotic device takes measurements.

In some embodiments, the measurement process for localization is similar to a wave propagation, as shown in FIG. 3. The immediate surroundings of robotic device 300 are initially observed using at least one measurement device for objects, obstacles, and perimeters followed by further distances into the surroundings as waves 301 propagate to reach perimeter 302. The search radius r of each propagating wave increases by a value A. When the processor of the robotic device detects an object, obstacle, or perimeter in a measurement captured by the at least one measurement device of the robotic device, the processor obtains a value that can be used to account for localization, at this instant, the probability density function collapses to a Dirac Delta function with a spike at some value C for the location x of the robotic device. The spike at some value C localizes the robotic device as being at location C at that instant. If other measurements are taken at that instant, the spike at some value C for the location x is confirmed but after that instant and with movement of the robotic device, the processor reverts the function back to being spread over possible values of x.

In some embodiments, λ is the localization resolution. For example, the processor uses multiples of λ to describe the placement of the sensor against the environment. In some embodiments, the resolution of measurement is not the same as the localization resolution; therefore, the processors casts the measurement into a possible location of the robotic device in multiples of λ. In some embodiments, the processor uses a probabilistic value to describe the likelihood of what multiple of λ to interpret the localization measurement to. In some embodiments, the processor determines the probabilistic value as the logit function:

$$\text{logit}(P(x)) = \log \frac{P(x)}{1 - P(x)}$$

wherein P(x) is the probability of x and $$\frac{P(X)}{1 - P(x)}$$

is the odds of x being true. In this case x is a multiple of lambda.

In some embodiments, the processor retains interpretations of the localization of the robotic device having lower probabilistic values, despite higher probabilistic values being indicative of a better interpretation of the localization of the robotic device. This is important as the robotic device may be localized differently for different multiples of λ and different localization results in a different map. For example, in FIG. 4 the processor uses a one-dimensional camera reading 400 of 9λ to localize the robotic device at location 401 with value $x_1$ while a camera reading 402 of 10λ is used to localize the robotic device at location 403 with value $x_2$. Since both readings localize the robotic device to different locations, each reading may result in a different map. In some embodiments, each location may be possible and alternative scenarios may be evaluated by the processor. In some embodiments, the number of alternative scenarios to evaluate may be predetermined or the processor selects the alternative scenarios to evaluate in real-time. For example, in discussing FIG. 4, the processor evaluates two possible scenarios, one where the robotic device is localized at location 401 with value $x_1$ and another where the robotic device is localized at location 403 with value $x_2$. However, other scenarios, such as localization of the robotic device at locations 404 and 405 with values $x_3$ and $x_4$, respectively, may be evaluated by the processor as well. In some embodiments, the processor uses more than one dimension for localization. However, as the number of dimensions used increases, the number of alternative scenarios does as well, and localization can become computationally expensive. In some embodiments with low resolution and low dimensionality, the processor monitors 4 to 30 alternatives for example. In some embodiments where the resolution is higher, a higher number of alternative scenarios may be required. In some embodiments, the processor monitors, for example, between 35 to 200 alternative scenarios. In some embodiments, the processor uses an adaptive algorithm to increase and decrease the number of alternative scenarios as needed. In some embodiments, the processor replaces alternative scenarios monitored by other alternatives through a process of fitness proportionate selection wherein the processor uses a fitness function to assign a fitness to possible alternative scenarios. In some embodiments, the fitness level is used to associate a probability of selection with each alternative scenario. In some embodiments, the processor determined the fitness function using:

$$p_i = \frac{f_i}{\sum_{j=1}^{N} f_j}$$

wherein $f_i$ is the fitness of alternative scenario i of N possible scenarios and $p_i$ is the probability of selection of alternative scenario i. In some embodiments, the processor is less likely to eliminate alternative scenarios with higher fitness level from the alternative scenarios currently monitored.

Figure 5A:
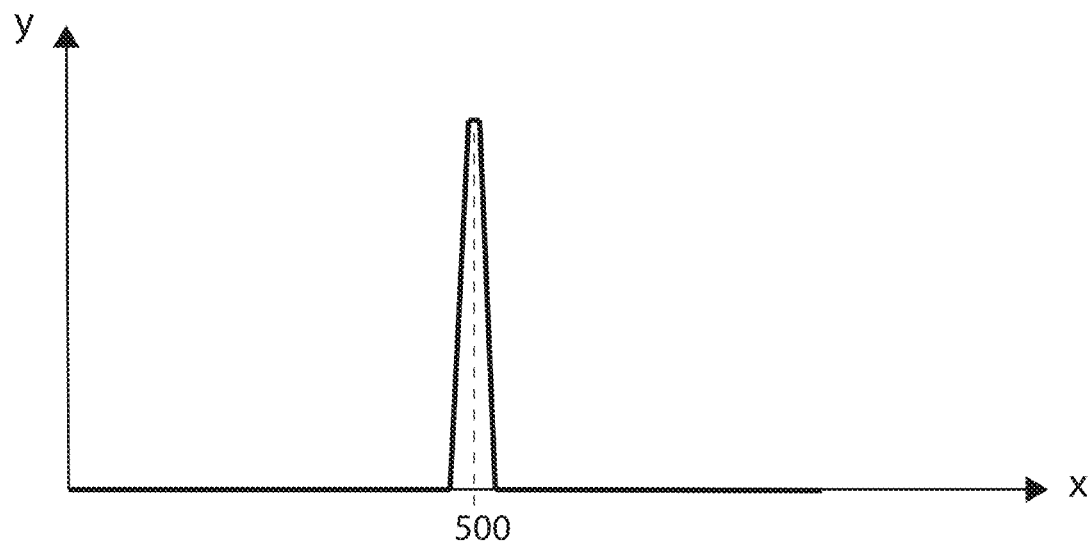
FIGS. 5A and 5B illustrate an embodiment of the use of multiple sensory devices for localization of a robotic device.
Figure 5B:
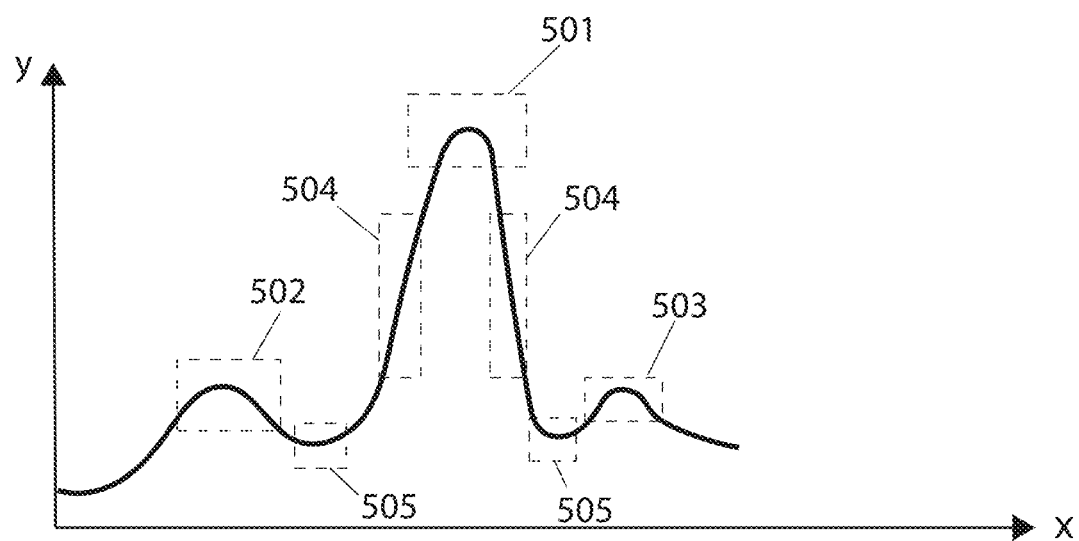

In some embodiments, wherein more than one measurement approach is used or multiple measurement devices are used, localization of the robotic device inferred by the processor has a higher certainty of being correct if readings are in-phase and/or agree with one another. In some embodiments, measurement is referred to as the combination of readings from multiple sensors once processed by the processor. In some embodiments, readings from multiple sensors may disagree and produce imprecise localization by the processor as different readings produce different measurement, thus placing the robotic device at different locations. For example, FIG. 5A illustrates a spike at some value 500 for the position x of the robotic device when readings from multiple sensors for localization are in agreement, wherein the y-axis represents the likelihood that the robotic device is located as some position x. The agreement of readings from multiple sensors results in a sharp maximum as the certainty of the localization at some value 500 for the position x of the robotic device increases from validation of readings from multiple devices. However, in some embodiments it is possible that multiple measurement approaches or readings from multiple sensors disagree wherein measurements or readings from different sensors result in the processor inferring different locations of the robotic device. For example, FIG. 5B illustrates probability distribution for possible values of the position x of the robotic device when readings of two sensors are in disagreement. Area 501 is formed as a result of the majority of readings from the two sensors being in agreement whiles areas 502 and 503 are formed from the readings of the two sensors being in disagreement, with each area corresponding to readings from a different sensor. Values for the position x of the robotic device within area 501 have high probability of being the position x of the robotic device. Values within area 504 have decreased probability of being the position x of the robotic device due to slight disagreement between measurement from readings of the two sensors. Values within areas 503 and 504 are a result of disagreement between the two sensors, wherein area 502 coincides with measurement from readings of one sensor and area 503 coincides with measurement from readings of the other sensor. Values for the position x of the robotic device within areas 505 have low probability of being the position x of the robotic device. In some embodiments, with some processing, the processor eliminates other possibilities such that the probability distribution function collapses to a Dirac Delta function. For example, in certain environments readings of some sensors may be considered less accurate than others and may therefore not considered or if the majority of readings from different sensors are in agreement the minority readings in disagreement are not considered or unrealistic readings are eliminated.

Figure 6:
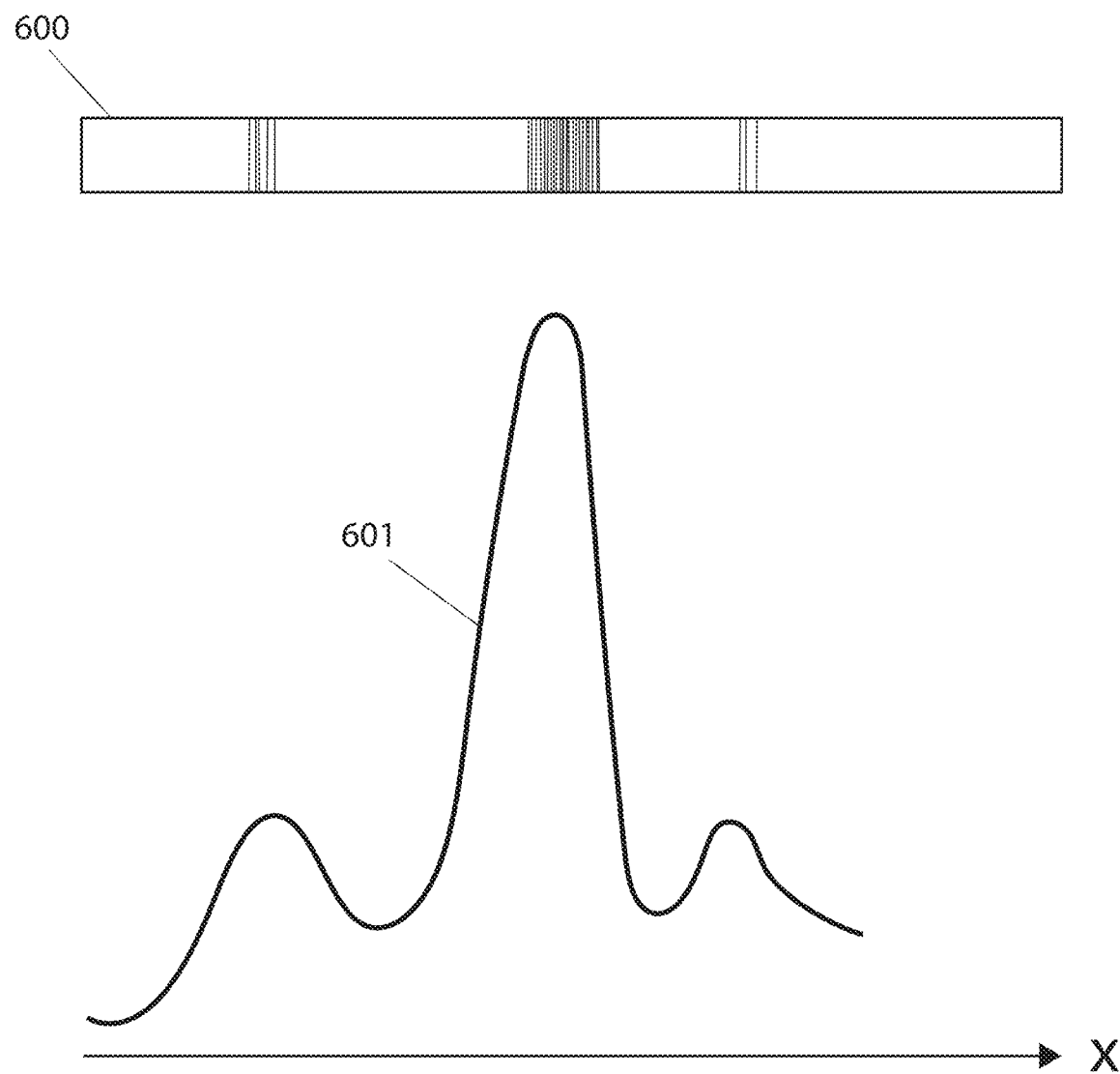
FIG. 6 illustrates an embodiment of discretization of measurements.

In some embodiments, the processor discretizes measurements, as shown in FIG. 6 with discrete representation 600 of possible positions x of the robotic device in graph 601. In some embodiments, the processor compares discrete values against a preprogrammed bias function. In some embodiments, the discretized values that are well matched with the noise and bias that are previously given to the robotic device are given more importance by the processor.

In some embodiments, a second measurement is taken by the same or another sensor of the robotic device and values of the first and the second measurement are compared and combined by the processor to form a more reliable measurement. In some embodiments, the first measurement and second measurement are not of the same kind. For example, a first measurement is derived from an odometer reading and a second measurement is derived from a range finder or a depth camera. In some embodiments, the processor compares the discretized values that are matched against a bias function to determine how they fit with a second discretized function. In processing of the information, as explained in the above embodiments, the measurement that is used is assumed to be accurate enough to localize the robotic device to some location C with a certain resolution.

In between measurements, the robotic device is in a state of superposition as it may only be localized by the processor when a measurement is taken. Therefore, if the system is interpreted as a Copenhagen Interpretation wherein the physical system does not have definite properties prior to being measured and only the probabilities that measurements will produce certain results may be predicted, it may be thought that measurement is what causes the robotic device to be perceived at some location C at a given time or that measurement, in effect, localizes the robotic device. For this reason, preparation and measurement are independent in some embodiments described herein. In some embodiments, preparation includes any action or control that causes the robotic device to take a particular measurement. For example, preparation includes the robotic device driving to a location wherein a particular measurement is taken or includes a user placing the robotic device or pushing the robotic device to a location wherein a particular measurement is taken. In some embodiments, the robotic device is assumed to be in an eigenstate, the state where the limit of repeated measurements converges to a specific value, when a sensory device of the robotic device takes a measurement of the surroundings. Thus, in some embodiments, preparation puts the system in an eigenstate.

Figure 7:
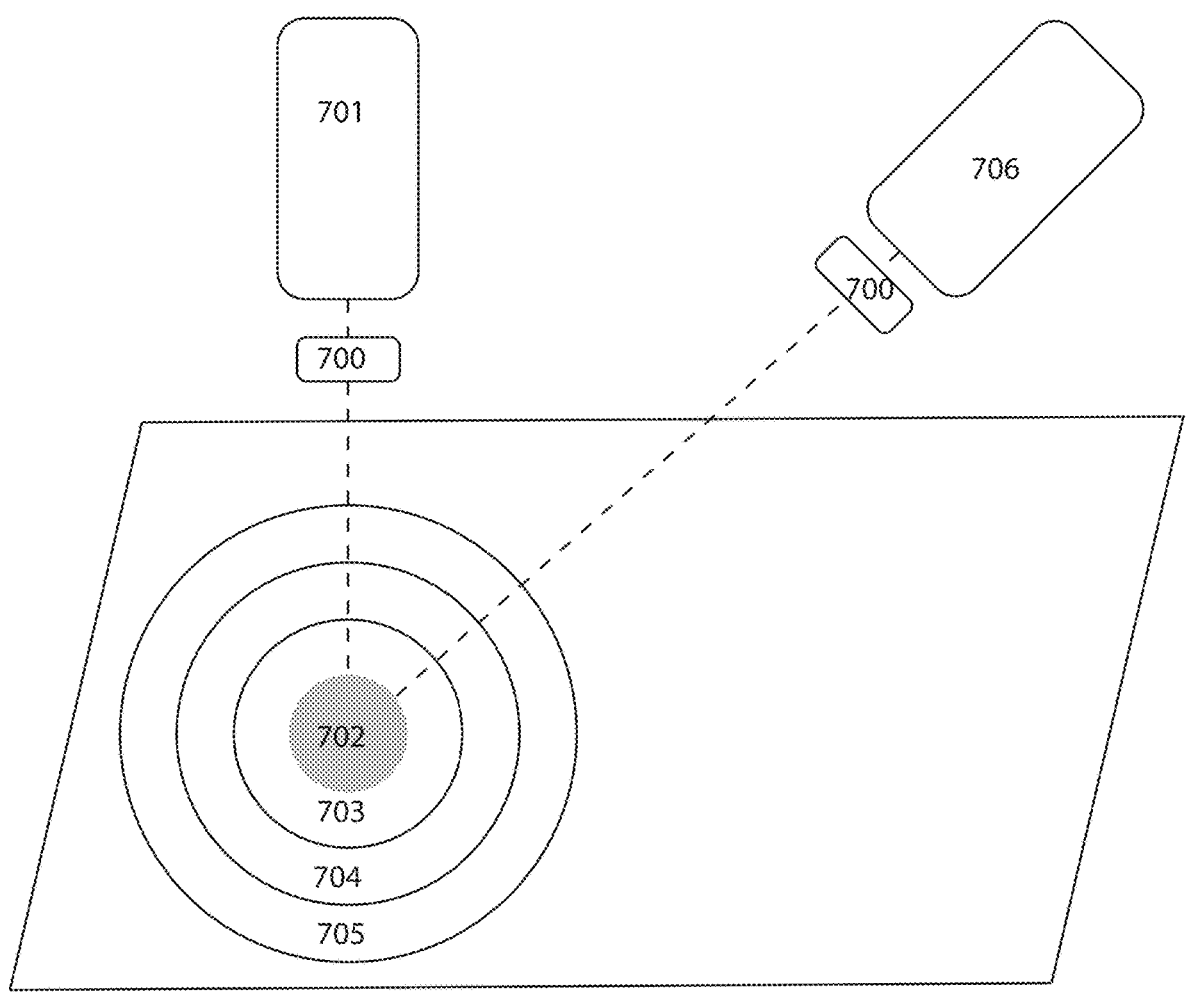
FIG. 7 illustrates an embodiment of preparation of a state.

In some embodiments, the collection of actions and/or controls that cause the robotic device to take the same particular measurement are said to prepare the same state and are referred to as preparation operators. For example, FIG. 7A illustrates robotic device 700 being dropped by a machine or other device through a vertically oriented tube 701 positioned directly above area 702 on driving surface 703. There is a high likelihood that this action will result in the robotic device landing directly below tube 701 in area 702. It is also possible it may land in areas 703, 704 or 705, though with less likelihood the further away the area is from area 702 located directly beneath tube 701. If the action were repeated n times, as n approaches infinity, the limit of the robotic device landing at some area A converges to $$\frac{m}{n},$$

where m is the number of times the robotic device lands in area A. The processor determines this convergence for areas 702, 703, 704 and 705. Based on the results, the area within which the robotic device is most likely located in reality converges to a specific area, the area A with greatest value m. Convergence usually occurs after many repetitions of the same action or experiment. At the beginning of experimentation, observations may not converge. At the beginning of the experiment, results may seem divergent or it may appear that the possibility of the robotic device landing in multiple areas is similar. However, as n increases, the area in which the robotic device is most likely located converges to 702. The processor determines convergence using the equation below.

$$P(A \mid C) = \lim_{n \to \infty} \frac{m}{n}$$

This can be thought of as the propensity of the robotic device landing in area A given condition C, which in this case is the action of the robotic device being released through tube 701, or otherwise the preparation operator. There may exist other preparation operators for the same state. For example, the action of robotic device 700 in FIG.

7B being released through tube 706 angled at 45 degrees with the same set of probabilities of landing in areas 702 through to 705 is said to prepare the same state. In some embodiments, a mathematically equivalent experiment comprising n robotic devices dropped at once producing the same results is said to prepare the same state. With the same logic, the limit of the robotic device landing at some area A converges to $$\frac{m}{n},$$

with a greater number of robotic devices landing in area 702 as compared to areas 703, 704 and 705. For a robotic device in operation, the processor assumes any actions and/or controls that produce the same results prepare the same state. As an alternative to counting the number of times the robotic device lands in an area A, the processor can apply the convergence in other ways. For example, if the mass of all robotic devices were equivalent and each separate area was a weighing scale, the limit of the weight in area A converges as well, where m in this case is the total weight in area A and n is the total weight of all areas combined. The processor determines the number of robotic devices in each area by dividing the total weight of an area by the weight of a single robotic device. Given the results of the experiment the processor deduces, for example, that the robotic device lands in area 702. With the different preparations being mathematically equivalent, as n→∞, preparations are considered interchangeable. To visualize n→∞, repeatedly dropping a large number of robotic devices a large number of times is envisioned wherein n×n=∞. Given the different possible preparations, the measurement taken remains independent of the preparation or the method by which the robotic device gets to areas 702 through to 705, for example. In operation, the processor calculates convergence or propensity of landing in an area A over time.

In the example provided herein, the probability of the robotic device landing in areas 702 to 705 is discussed. However, the probability of the robotic device being located at very remote areas is not zero as there is always a possibility that the robotic device is located anywhere. However, in some embodiments, the processor of the robotic device compares all possible areas and their corresponding convergence results and eliminates areas with low probabilities, leaving only most intuitive and realistic areas for evaluation.

In some embodiments, having separated measurement and preparation, the processor interprets Ψ discretely. For example, in the case of a vector ket |X⟩ of n linearly independent elements $(x_1, x_2, \ldots, x_n)$ in a Hilbert Space, a preparation vector ket |P⟩ acts on each element of vector ket |X⟩ such that a measurement produces an element in ket |Ψ⟩, an eigenvector describing all possible eigenstates of the robotic device. Therefore, ket |Ψ⟩ is broken down by the processor to vectors acting on the space vector. Using Bra-Ket notation, the processor uses:

$$|\Psi\rangle = C_1|X\rangle + C_2|P1\rangle + C_3|P2\rangle + \ldots$$

wherein C is an eigenvalue of scalar coefficient stretching the vector in the space. The processor uses this discrete approach to filter out states of the robotic device with low possibility or without any possibility of being true.

By describing localization in a Hilbert Space, localization of the robotic device is not confined to a Cartesian coordinate system. Different sets of vectors are used by the processor in localization of the robotic device whereby each set of vectors that cannot be represented as multiplication of other vectors increases the dimensionality of the system. For example, in some embodiments, the processor localizes the robotic device against a certain type of floor assuming sensors are capable of processing and distinguishing floor types based on the reflection from the emitted light; against a room in which the robotic device may be working wherein the room is represented as a graph of connected nodes; against a certain height measured relative to the floor given different heights are defined in the space; against a certain Wi-Fi strength; against presence or strength of light, sound, people, objects and or any other substance or material; against the slope of the environment; against the amount of power required by the system assuming different locations require different power, as in case of requiring more power for driving up a slope; and against amp withdrawal. As a further example, the processor localizes the robotic device against an edge at which two walls meet. To do so, the processor first identifies an edge. Using distance-based measurement, the processor uses the sum of squared differences between the distances from each of the two walls to identify the meeting of the two walls, or otherwise their shared edge. Movement along one wall in a direction away from the edge results in a large number. Movement along both walls results in a small number and signifies an edge. In some cases, the processor localizes the robotic device against a corner. Using image-based measurement, the processor runs a sliding window through an image. A shift of the sliding window along the wall results in small changes of intensity while a shift perpendicular to the wall or a corner or isolated point results in large changes. Therefore, the processor identifies a corner or edge when a shift of the sliding window along an image results in large changes in intensity. U.S. patent application Ser. No. 15/954,410, the entire contents of which are hereby incorporated by reference, describes an embodiment of a method for detecting an edge or corner.

This multi-dimensionality in localization provides robustness that may be useful in various applications. In some embodiments, the processor of the robotic device uses the types of localization described above for controlling the operation, settings, and functionality of the robotic device. For example, the processor uses localization to control the behavior of the robotic device in different areas, where for instance, certain cleaning functions or settings are desired for different environments. These functions or settings may be triggered once the processor has localized the robotic device against the environment. For example, it may be desirable to run the motor at a higher speed when moving over rough surfaces, such as soft flooring as opposed to hardwood, wherein localization against floor type or against a room may trigger the motor speed. As a further example, localization may also be used in controlling the movement of the robotic device. If the processor localizes the robotic device against a boundary, for example, it may choose to select a path along the boundary or it may trigger a polymorphic or other type of path planning algorithm, such as those described in U.S. patent application Ser. Nos. 16/041, 286, 15/406,890, and 14/673,633, the entire contents of which are hereby incorporated by reference. Or, localizing the robotic device against a boundary may trigger a path planning algorithm for cleaning central areas of the environment and, once completed, a wall follow algorithm for cleaning along the boundaries of the environment.

In some cases, the measurements taken provide less information of the observed surroundings than others but do provide to some degree a sense of the surroundings of the robotic device. For example, the sensors of the robotic device take a measurement for which no objects, obstacles, or perimeters exist within the measurement range. Although the measurement device of the robotic device does not measure any objects, obstacles, or perimeters, the processor still gains useful information about its surroundings. It can conclude that there are no objects, obstacles, or perimeters between the robotic device and the maximum measurement range, thereby gaining a sense of the surroundings.

In some embodiments, the processor localizes the robotic device using other methods. For example, the processor localizes the robotic device within a space, such as a phase space or Hilbert space. The space includes all possible states of the robotic device within the space. In some embodiments, a probability distribution of a space, such as a phase or Hilbert space, may be used by the processor of the robotic device to approximate the likelihood of the state of the robotic device being within a specific region of the space. In some embodiments, the processor of the robotic device determines a phase space probability distribution over all possible states of the robotic device within the phase space of the robotic device using a statistical ensemble. In some embodiments, the processor of the robotic device may update the phase space probability distribution when the processor receives readings. Any type of reading that may be represented as a probability distribution that describes the likelihood of the state of the robotic device being in a particular region of the phase space may be used. In some embodiments, the processor of the robotic device may determine a probability density over all possible states of the robotic device within a Hilbert space using a complex-valued wave function for a single-particle system. In some embodiments, the probability density of the Hilbert space may be updated by the processor of the robotic device each time an observation or measurement is received by the processor of the robotic device. In embodiments, wherein the state of the robotic device within a space is initially unknown, the processor of the robotic device may generate a uniform probability distribution over the space. In other instances, any other probability distribution may be generated depending on the information known about the state of the robotic device and the certainty of the information. Over time and as more measurements and observations are received by the processor of the robotic device, the probability distribution over all possible states of the robotic device in the space evolves.

In some embodiments, the robotic device moves while scanning a surrounding environment using a device capable of measuring depth or data from which depth can be inferred. In some embodiments, the processor of the robotic device creates an initial low-resolution map of environment using a subset of the scans. In some embodiments, the processor initially assumes the robotic device is located somewhere within an area greater than the size of the robotic device. The processor reduces the size of area when data is collected and increases the size of the area when the robotic device moves. As the robotic device moves the processor adjusts the shape of the area based on deviation between the measured and true heading and translation of the robotic device. In some embodiments, the processor assigns a likelihood of the robotic device being located at each possible location of the robotic device within the area.

Figure 8A:
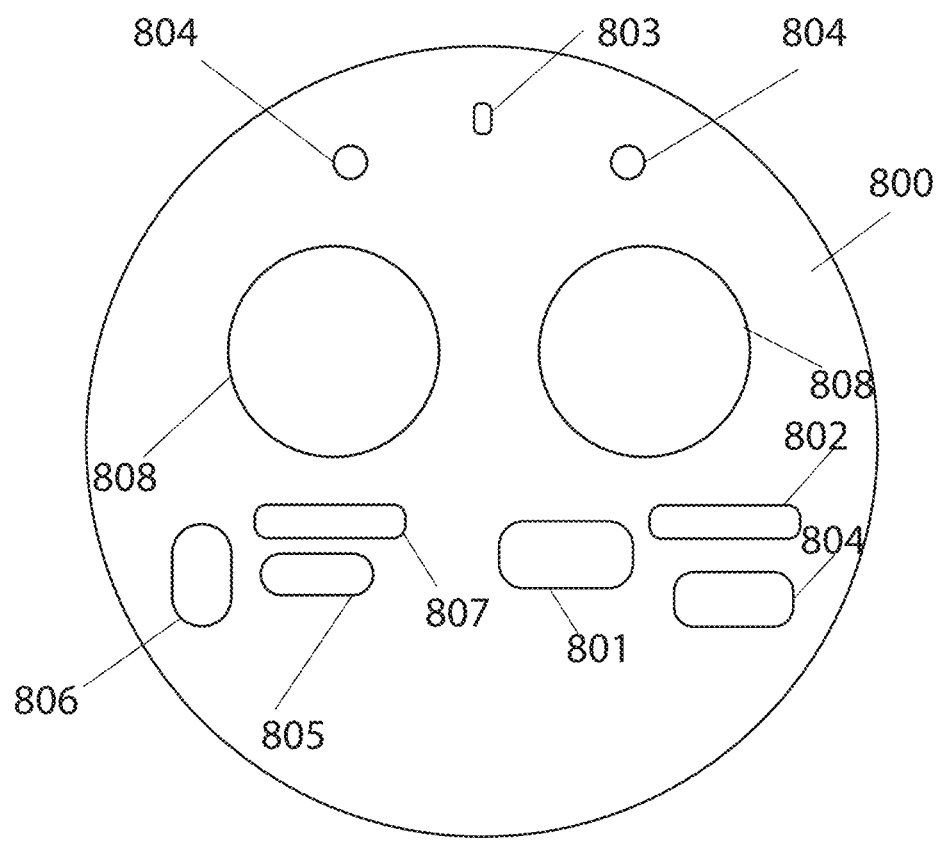
FIGS. 8A and 8B illustrate schematic diagrams of an example of a robotic device with which the present techniques may be implemented in some embodiments.
Figure 8B:
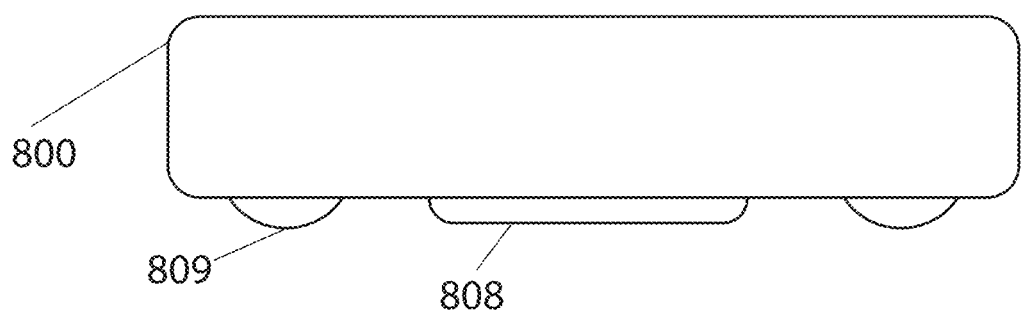

FIG. 8A illustrates a top view of an example of a robotic device 800 with processor 801, memory 802, a measurement device 803, a pair of sensors 804, network communication 805, movement driver 806, timer 807, and tool 808 (e.g., circular brush for cleaning). The first and second set of sensors 803 and 804 may include depth measuring devices, movement measuring devices, and the like. In some embodiments, the robotic device may include the features of a robotic device described herein. In some embodiments, program code stored in the memory 802 and executed by the processor 801 may effectuate the operations described herein. FIG. 8B illustrates a side view of the robotic device 800 with wheels 809 and tool 808. In some embodiments, the robotic device includes a customizable versatile mobile robotic chassis customized to function as a robotic device. An example of a customizable versatile mobile robotic chassis is described in U.S. patent application Ser. No. 16/230,805, the entire contents of which is hereby incorporated by reference.

Figure 9:
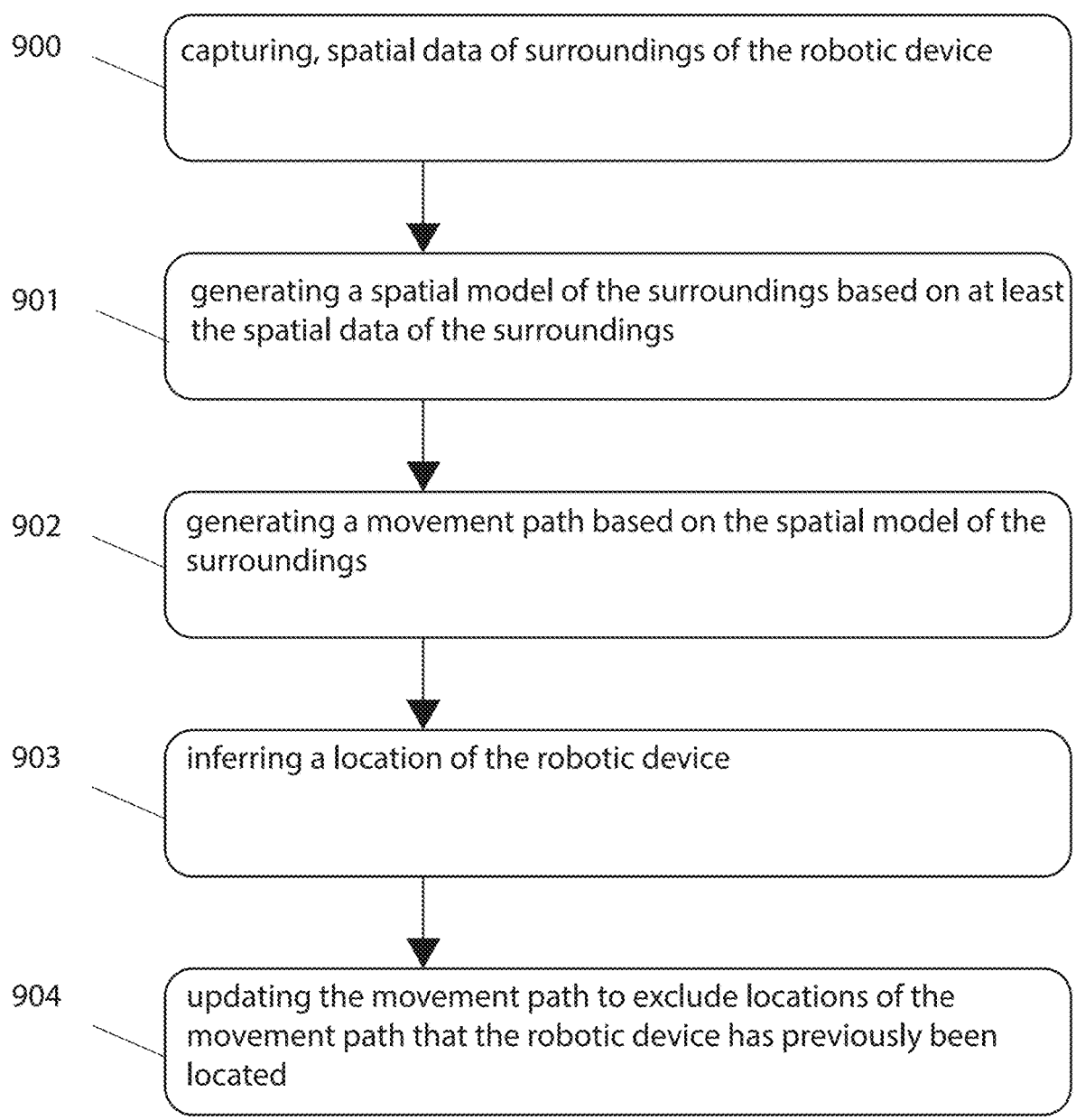
FIG. 9 illustrates a flowchart describing an example of a method for generating a movement path of a robotic device, according to some embodiments.

FIG. 9 illustrates a flowchart describing embodiments of a robotic device path planning method 900, 901, 902, 903, and 904 corresponding with steps performed in some embodiments. In some embodiments, inferring the location of the robotic device, step 903 in the flowchart, includes determining, with the one or more processors of the robotic device, a probability of the robotic device being located at different possible locations within the surroundings based on the at least one measurement; and inferring, with the one or more processors of the robotic device, the location of the robotic device based on the probability of the robotic device being located at different possible locations within the surroundings, wherein the one or more processor of the robotic device infers the location of the robotic device at intervals of a predetermined travel distance of the robotic device or when the certainty of the location of robotic device is below a predetermined threshold.

In some embodiments, a robot repelling device is used with the robotic device for confinement of the robotic device within a particular area. In some embodiments, the repelling device includes a signal emitter positioned within a housing and that is activated by an input device. In some embodiments, the robot includes a signal receiver for receiving the signal emitted by the signal emitter of the repelling device. In some embodiments, the robot is configured to change direction upon reaching a minimum allowable distance from the repelling device. In one embodiment, the minimum allowable distance is set by a predetermined range of the signal and the robot alters the movement path upon detecting the signal. In an alternative embodiment, the minimum allowable distance is transmitted to the robot by an information packet carried by the signal. In embodiments, the repelling device is portable such that a virtual boundary may be created in different locations.

Figure 10:
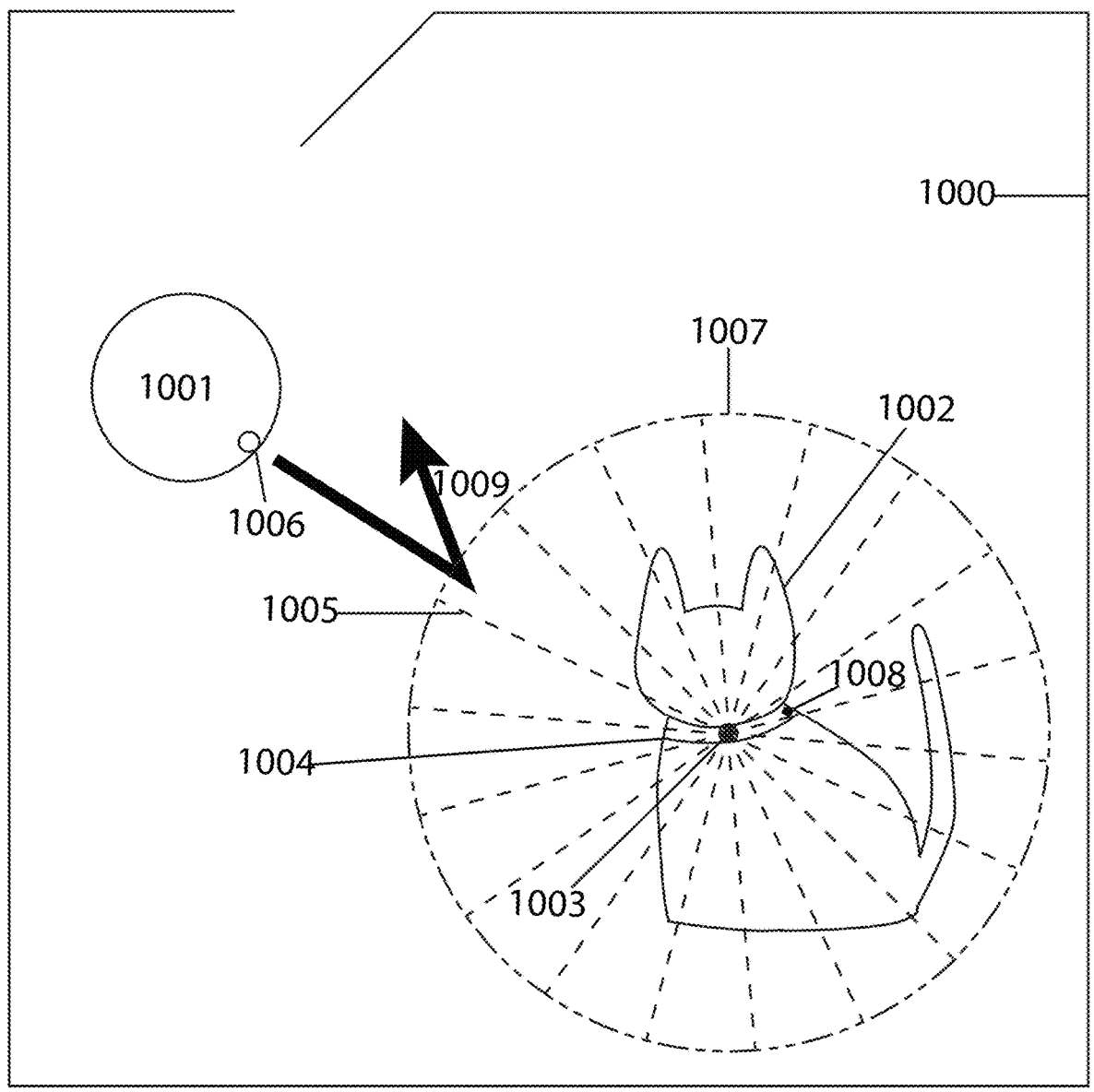
FIG. 10 illustrates an embodiment of a robot-repelling system.

FIG. 10 illustrates an example of a robot repelling system used to keep a robot from approaching too close to a pet. Room 1000 is shown containing a robot 1001 and a pet 1002. A signal emitter 1003 is positioned in a housing 1004 which may be attached to the pet. The signal emitter emits signals 1005 detectable by the signal receiver 1006 positioned on the robot when the robot is within a range 1007 of the signals. An input device 1008 may be used to turn on the signal emitter. When the signal emitter is turned on, if the robot enters the area of the signal range 1007, it will detect the signals 1005 by the signal receiver 1006. Upon detection of the signals, the robot is configured to alter its movement path 1009 so that the signals are no longer detectable by the signal receiver 1006. In some embodiments, the housing 1004 may contain a plurality of signal emitters, each signal emitter having a different signal range. A user can adjust the allowable distance between the robot and the repelling device by choosing the signal emitter with the desired range through the input device.

Figure 11:
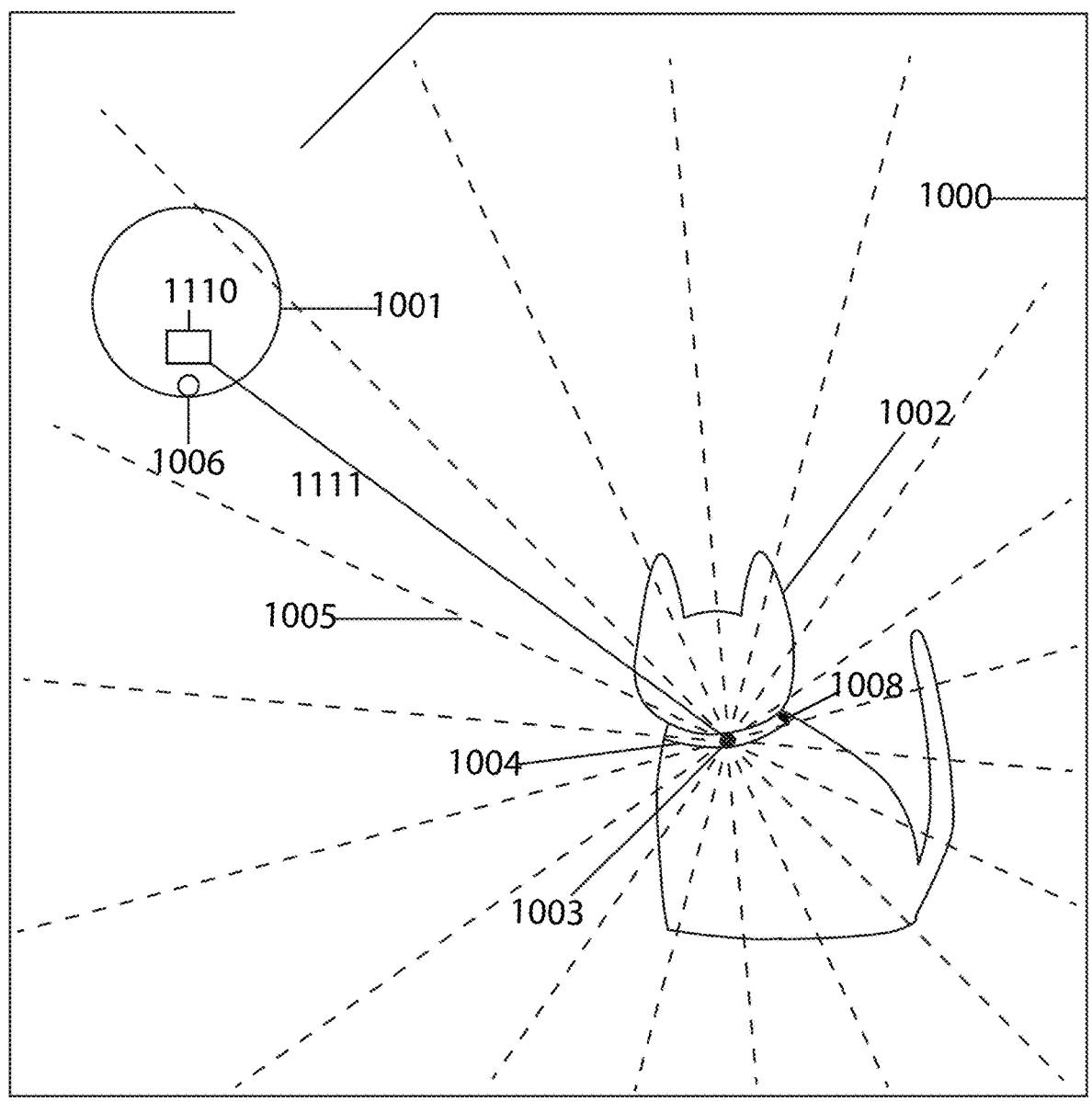
FIG. 11 illustrates an embodiment of a robot-repelling system.

FIG. 11 illustrates an alternative embodiment of the robot repelling system. In this embodiment, a minimum allowable distance between the signal emitter 1003 and the robot 1001 is predetermined and included in a packet of information carried by the signals 1111. Room 1000 is shown containing the robot 1001, including the signal receiver 1006, and the pet 1002. The signal emitter 1003 is positioned in the housing 1004 attached to the pet. In this embodiment, the robot further comprises a means 1110 for determining a distance 1111 to the signal emitter 1003. The signal emitter 1003 sends signals 1005 which carry a packet of information (not shown) identifying the minimum allowable distance between the signal emitter 1003 and the distance determining tool 1110. A user may turn on the signal emitter 1003 via the input device 1008 which causes the signal emitter 1003 to begin sending signals 1005 containing the minimum allowable distance between the distance determining tool 1110 and the signal emitter. The receiver 1006 receives the signal containing the minimum allowable distance between the distance determining tool and the signal emitter. Using the distance determining tool 1110, the system determines the distance 1111 to the signal emitter 1003. If the distance 1111 is smaller than or equal to the minimum allowable distance indicated by the signal, the robot is caused to alter its movement path until the distance 1111 is greater than the minimum allowable distance between the distance determining tool 1110 and the signal emitter 1003.

It shall be appreciated by one skilled in the art that in other embodiments any number of known input devices may be used, such as keypads, toggle devices, voice activated switches, timers, control systems, optical sensors, wireless switches connected to applications, software applications or any other wireless control device, etc. Also, the means for measuring distance between the distance determining tool 1110 and the signal emitter 1003 can be any available non-contact measuring system, such as electronic distance meters, ultrasonic ranging modules (sonar, echo sounding), radar distance measurement devices, laser rangefinders, LIDAR, etc.

Figure 12:
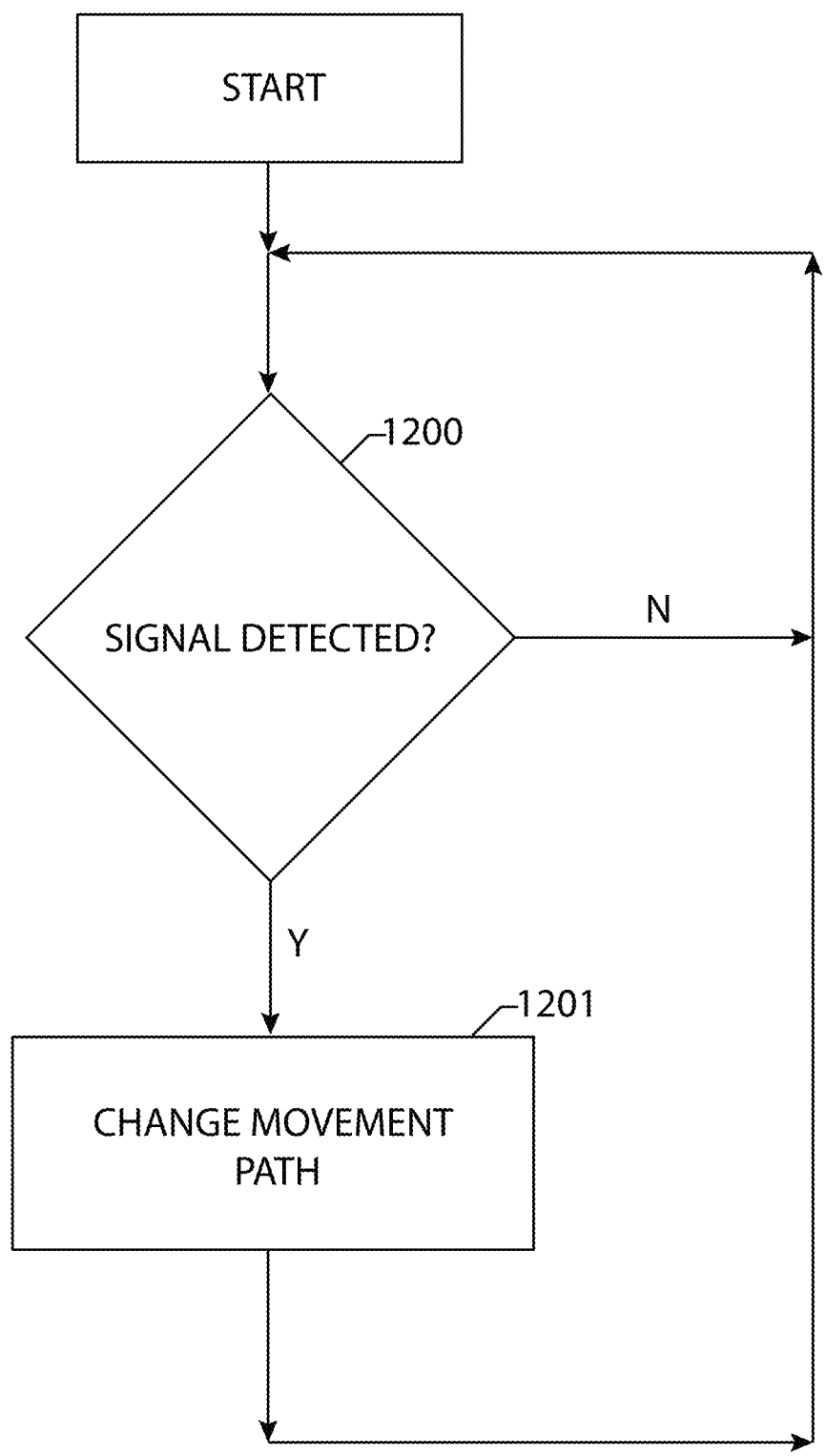
FIG. 12 illustrates a flowchart describing an example of a robot repelling method, according to some embodiments.

FIG. 12 illustrates a flow-chart of the control logic of a robot repelling method. In some embodiments, the minimum allowable distance between the signal emitter and the compatible robot is determined by the range of the signal. In a first step 1200, the receiver searches for the signal. If the signal is not detected, the robot continues its movement path and continues to search for the signal. If the signal is detected, the method proceeds to a step 1201 in which the robot alters its movement path such that it returns to an area where the signal is no longer received. Various movement patterns for returning to an area where the signal is no longer received are possible; the robot may use any available method for altering the movement path. The method then proceeds back to step 1200.

Figure 13:
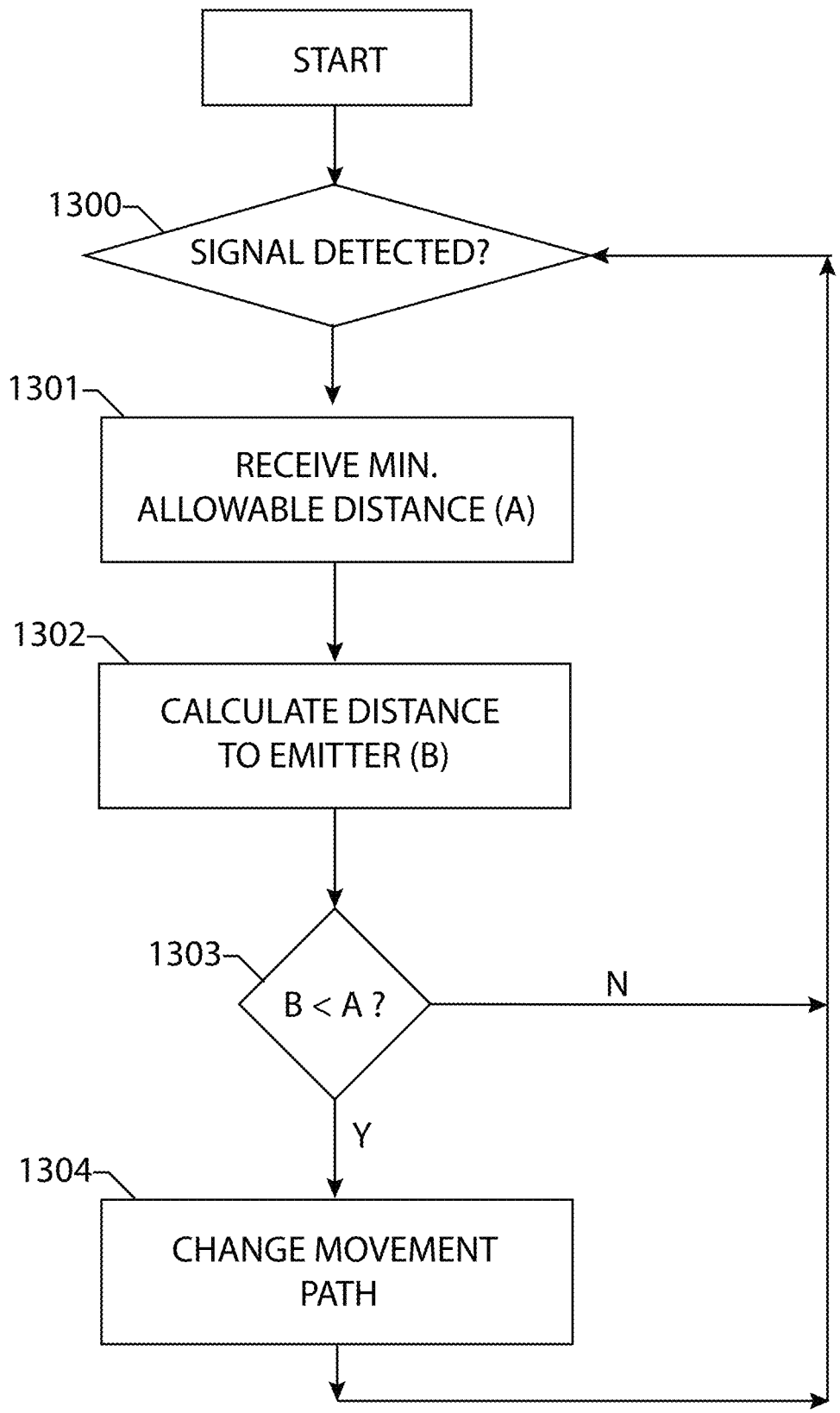
FIG. 13 illustrates a flowchart describing an example of a robot repelling method, according to some embodiments.

FIG. 13 illustrates a flow-chart of another embodiment of a robot repelling system. As described previously, in some embodiments, the minimum allowable distance between the robot (or a component thereof) and the signal emitter is determined by an information packet carried by the signal. In a first step 1300, the receiver searches for the signal. If the signal is not detected, the robot continues its movement path and continues to search for the signal. If the signal is detected, the method proceeds to a step 1301, in which the system receives the minimum allowable distance A between the robot (or a component thereof) and the signal emitter. In a next step 1302, the robot determines a distance B to the repelling device. In a next step 1303, the method compares values B and A. If B is less than or equal to A, the method proceeds to a step 1304 in which the robot changes its movement path such that it moves away from the signal emitter until such a point that B is greater than A. If B is greater than A, the method returns to step 1302.

In some embodiments, sensors of the robotic device are positioned such that the field of view of the robotic device is maximized while cross-talk between sensors is minimized. In some embodiments, sensor placement is such that the IR sensor blind spots along the perimeter of the robot in a horizontal plane (perimeter perspective) are minimized while at the same time eliminating or reducing cross talk between sensors by placing them far enough from one another.

In some embodiments, an obstacle sensor (e.g., IR sensor, TOF sensor, TSSP sensor, etc.) is positioned along the front of the robotic device at the midpoint such that the vertical blind spot of the robotic device is minimized and such that the robotic device is intentionally blind to objects below a predetermined height relative to the floor. For example, the robotic device is blind to obstacles of certain size. In some embodiments, the predetermined height, below which the robotic device is blind, is smaller or equal to the height the robotic device is physically capable of climbing. This means that, for example, if the wheels (and suspension) are capable of climbing over objects 20 mm in height, the obstacle sensor should be positioned such that it can only detect obstacles equal to or greater than 20 mm in height. In some embodiments, a buffer is implemented and the predetermined height, below which the robotic device is blind, is smaller or equal to some percentage of the height the robotic device is physically capable of climbing (e.g., 80%, 90%, or 98% of the height the robotic device is physically capable of climbing). The buffer increases the likelihood of the robotic device succeeding at climbing over an obstacle if the processor decides to execute a climbing action.

In some embodiments, at least one obstacle sensor (e.g., IR sensor, TOF sensor, TSSP sensor, etc.) is positioned in the front and on the side of the robotic device. In some embodiments, the obstacle sensor positioned on the side is positioned such that the data collected by the sensor can be used by the processor to execute accurate and straight wall following by the robotic device. In alternative embodiments, at least one obstacle sensor is positioned in the front and on either side of the robotic device. In some embodiments, the obstacle sensor positioned on the side is positioned such that the data collected by the sensor can be used by the processor to execute accurate and straight wall following by the robotic device.

Figure 14:
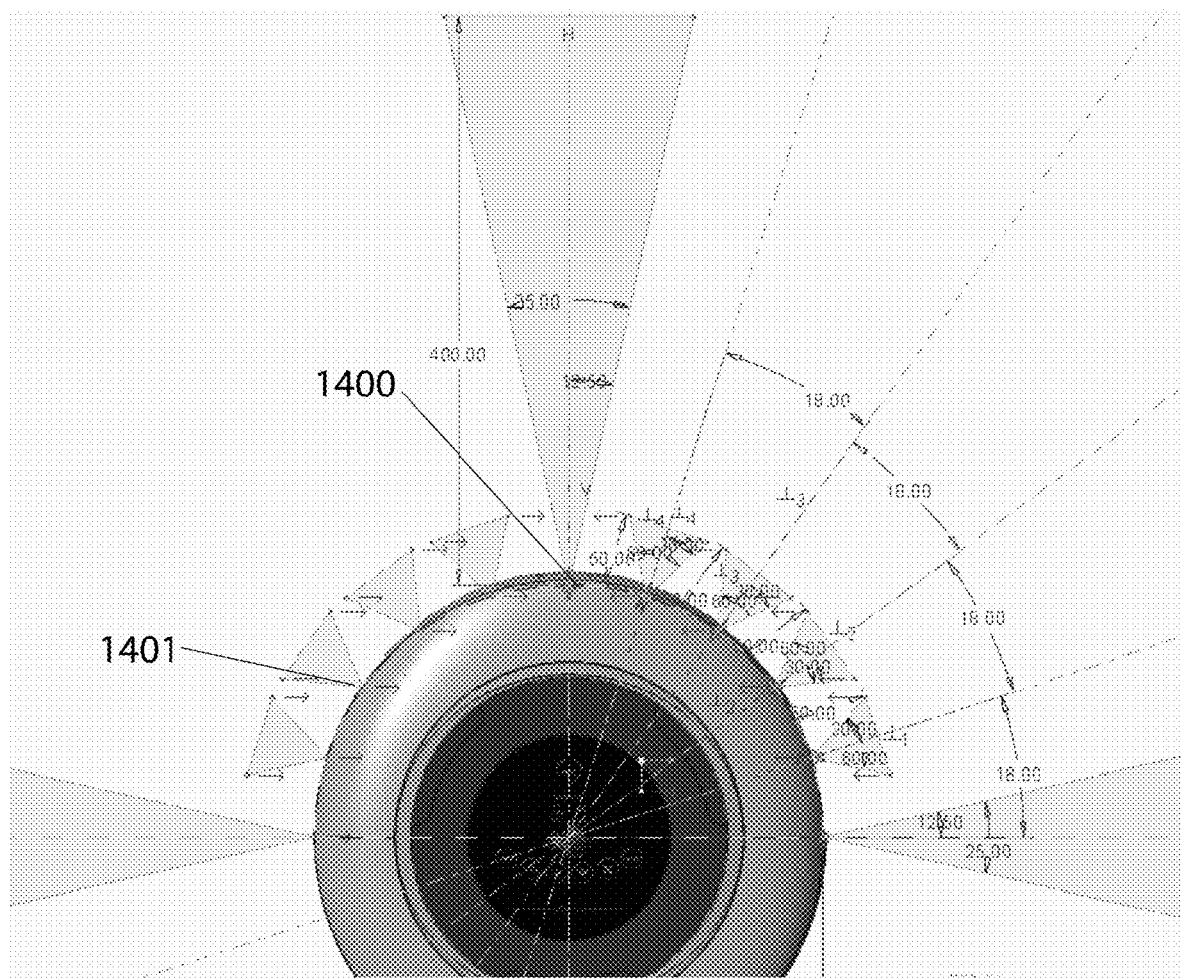
FIG. 14 illustrates an example of positions of sensors on a mobile robotic device, according to some embodiments.

FIG. 14 illustrates an example of the position sensors on a robotic device. Sensors are placed along the front perimeter of the robotic device and are positioned 18 degrees apart in a horizontal plane. In this example, one sensor 1400 is positioned at the front midpoint of the robotic device and has a 25 degree field of view in a horizontal plane. Ten other sensors 1401 are positioned along the perimeter of the robotic device and each have a 60 degree field of view in a horizontal plane. The position of the sensors allows for maximum combined field of view with minimal cross-talk among adjacent sensors.

In some embodiments, the robotic device includes mecanum wheels driven by one or more motors that allow the robotic device to move in any direction along the driving surface. The mecanum wheels may improve maneuvering and avoid typical problems robotic devices encounter, such as becoming stuck in tight areas or lack of access to corners. The mecanum wheels may provide the robotic device the ability to move instantaneously in any direction from any configuration. For example, the robotic device can travel diagonally by moving a front wheel and opposite rear wheel at one speed while the other wheels turn at a different speed, moving all four wheels in the same direction straight moving, running the wheels on one side in the opposite direction to those on the other side causing rotation, and running the wheels on one diagonal in the opposite direction to those on the other diagonal causes sideways movement.

Figure 15A:
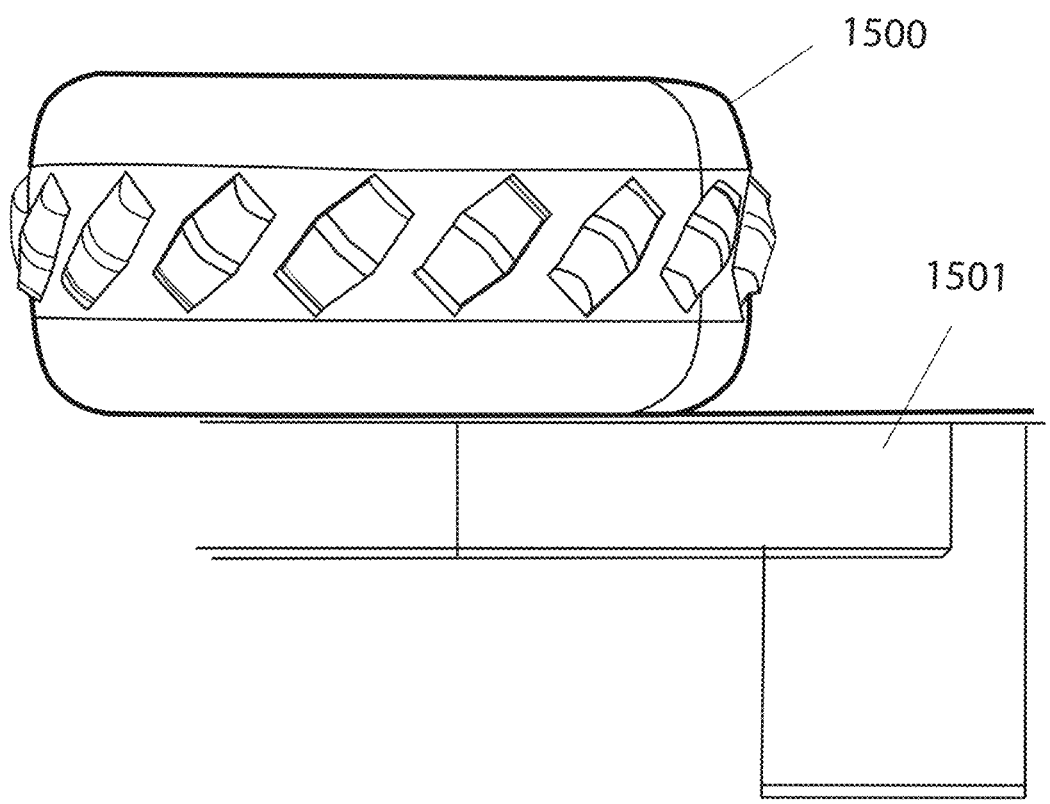
FIGS. 15A and 15B illustrate examples of mecanum wheels, according to some embodiments.
Figure 15B:
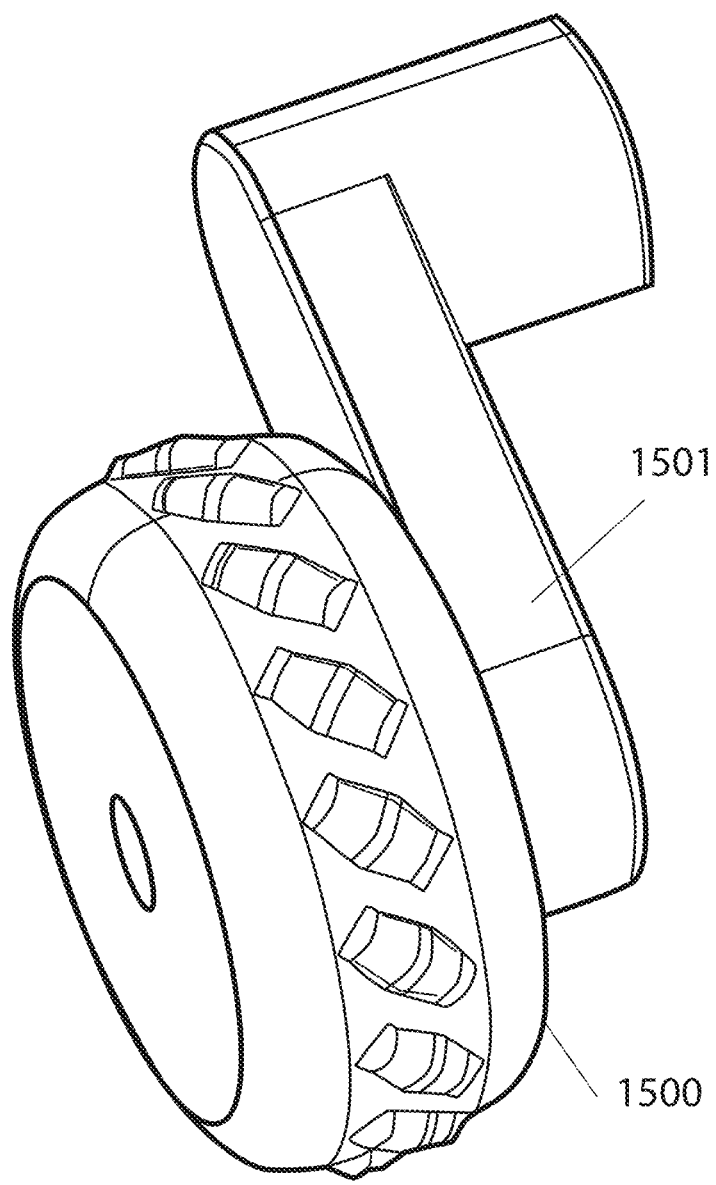
Figure 16A:
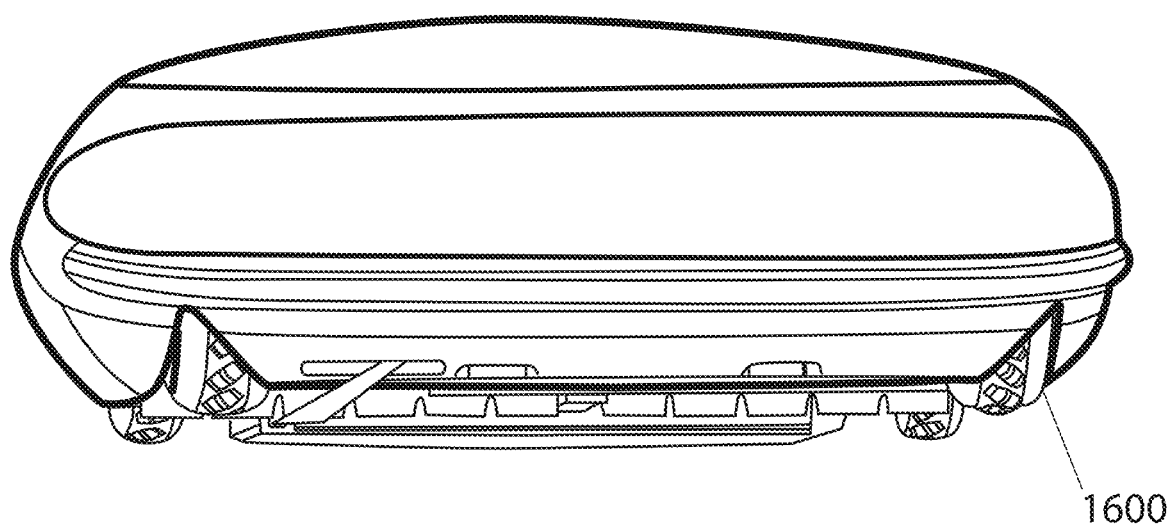
FIGS. 16A and 16B illustrate examples of a robotic device with mecanum wheels, according to some embodiments.
Figure 16B:
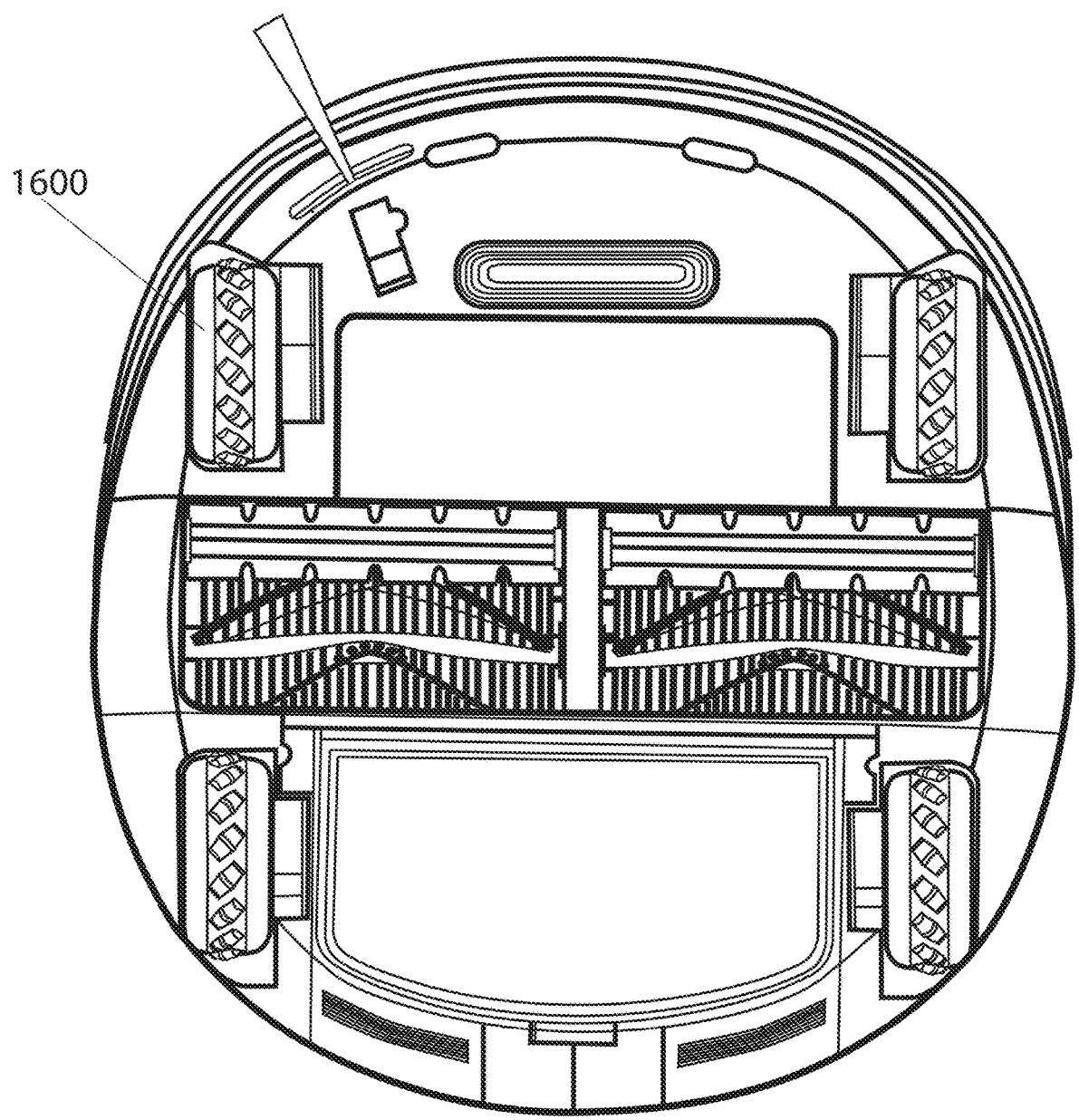

FIGS. 15A and 15B illustrate examples of a mecanum wheel 1500 attached to an arm 1501 of a robotic device. The arm may be coupled to a chassis of the robotic device. FIGS. 16A and 16B illustrate a front and bottom view of an example of a robotic device with mecanum wheels 1600, respectively, that allow the robotic device to move in any direction. In some embodiments, the wheels are expandable such that the robotic device may climb over larger obstacles. Examples of expandable mecanum wheels are described in U.S. patent application Ser. Nos. 15/447,450 and 15/447,623, the entire contents of which are hereby incorporated by reference.

Figure 17A:
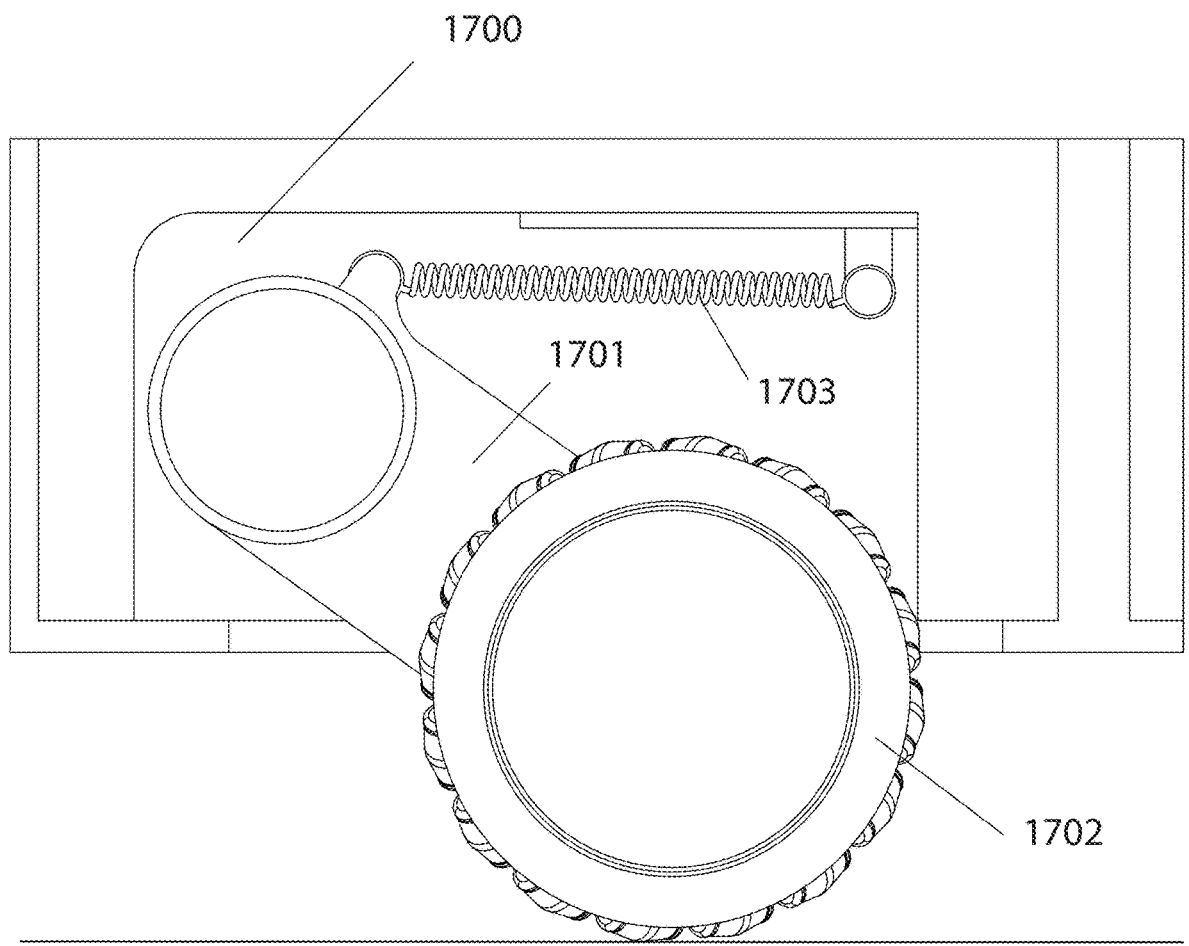
FIGS. 17A and 17B illustrate an example of a first suspension system of a robotic device when the wheel is extended and retracted, respectively, according to some embodiments.
Figure 17B:
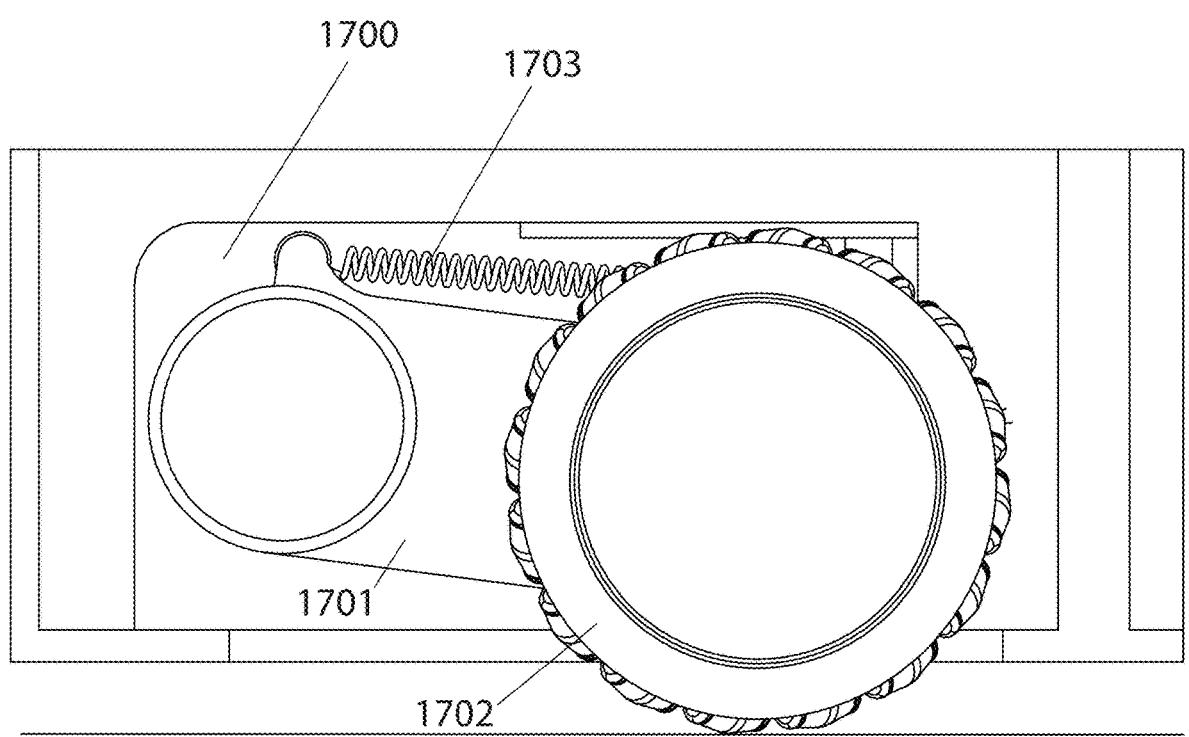

In some embodiments, the robotic device includes a dual suspension system. In some embodiments, the wheels used with the dual suspension system are mecanum wheels, allowing the robotic device to move in any direction. In some embodiments, a first suspension system of the dual suspension system includes a frame, a rotating arm pivotally coupled to the frame on a first end and coupled to a wheel on a second end, and an extension spring coupled with the rotating arm on a third end and the frame on a fourth end, where the extension spring is extended when the wheel is retracted. In some embodiments, the extension spring of the first suspension system applies a force to the rotating arm as the extension spring compresses, causing the rotating arm to rotate outwards beyond the base towards the driving surface. In some embodiments, the rotating arm rotates outwards beyond the base towards the driving surface until the wheel coupled to the rotating arm contacts the driving surface. In some embodiments, the wheel coupled to the rotating arm presses against the driving surface when the rotating arm is forcibly rotated outwards beyond the base towards the driving surface. FIGS. 17A and 17B illustrate an example of a first suspension system of a robotic device with the wheel in an extended and retracted position, respectively. The first suspension system includes a frame 1700, a rotating arm 1701 pivotally coupled to the frame 1700 on a first end and coupled to a wheel 1702 on a second end, and an extension spring 1703 coupled with the rotating arm on a third end and the frame 1700 on a fourth end, where the extension spring 1703 compressed when the wheel is extended beyond the frame (FIG. 17A) and extended when the wheel is retracted towards the frame (FIG. 17B).

Figure 18A:
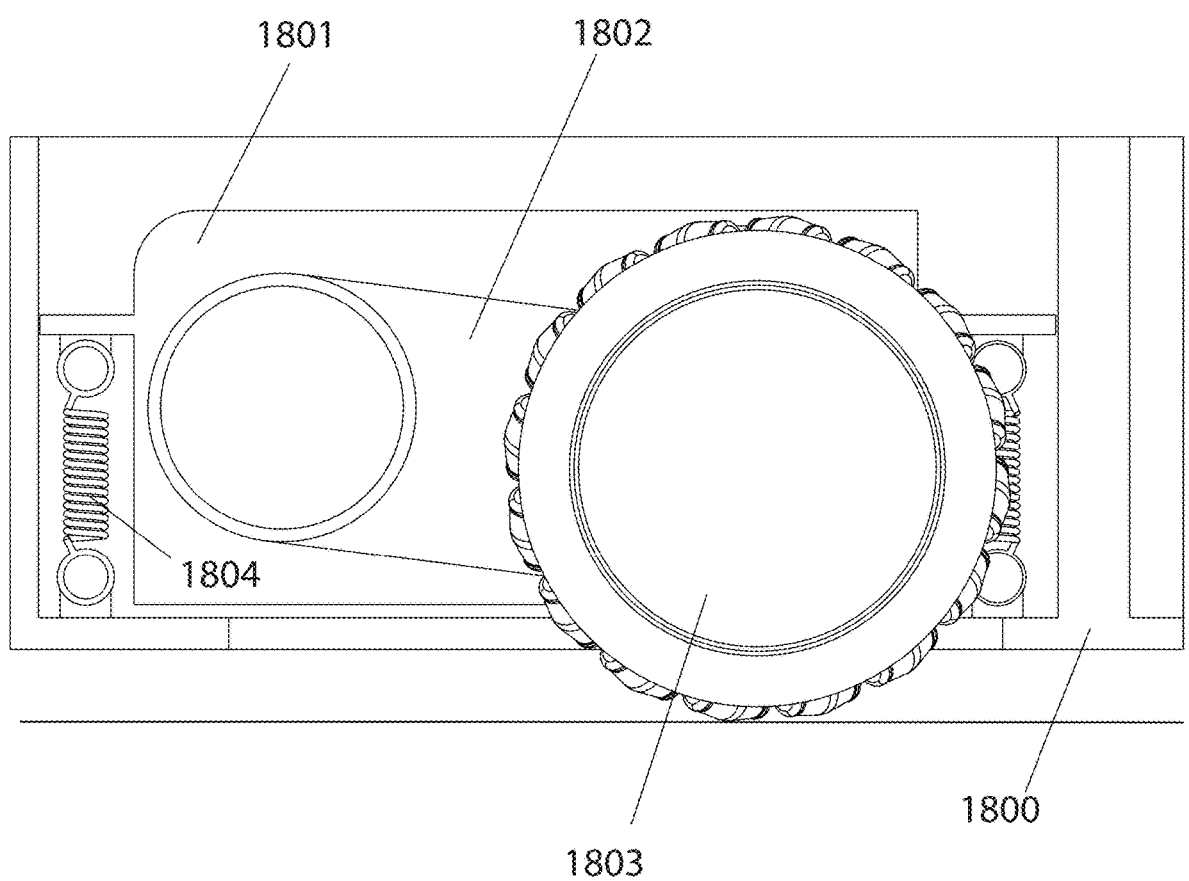
FIGS. 18A and 18B illustrate an example of a second suspension system of a robotic device when the wheel is extended and retracted, respectively, according to some embodiments.
Figure 18B:
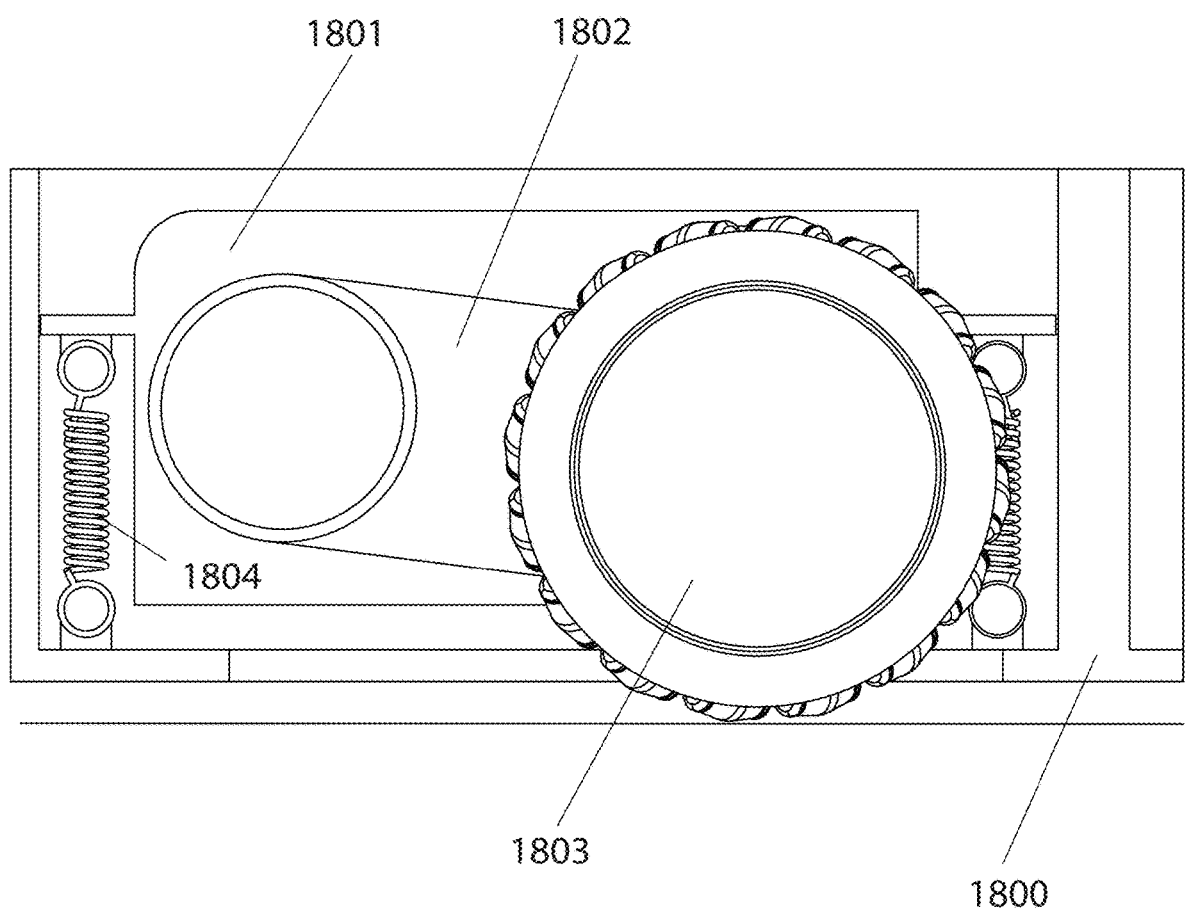

In some embodiments, the second suspension system of the dual suspension system is a vertical suspension system including a base slidingly coupled with the frame, and a number of vertically positioned extension springs coupled with the frame on a first end and the base on a second end. In some embodiments, the number of extension springs of the second suspension system apply a force to the frame and base, pulling the two components together as the extension springs compress. In some embodiments, extension of the number of extension springs of the second suspension system cause vertical upward movement of the frame, rotating arm, and wheel relative to the base. In some embodiments, compression of the number of extension springs of the second suspension system cause vertical downward movement of the frame, rotating arm, and wheel relative to the base. In some embodiments, the base is fixed to the robotic device chassis or is part of the robotic device chassis. FIGS. 18A and 18B illustrate an example of a second suspension system when the springs are compressed and extended, respectively. The second suspension system includes a base 1800 slidingly coupled with a frame 1801, an arm 1802 coupled to the frame 1801 on a first end and coupled to a wheel 1803 on a second end, and vertically positioned extension springs 1804 coupled with the frame 1801 on a first end and the base 1800 on a second end.

In some embodiments, the frame includes a number of spring housings for retaining the number of extension springs from the second suspension system. In some embodiments, the portion of the second suspension system further includes a number of dampers positioned along each axis of each of the number of extension springs. The portion from the second suspension system mitigates the effect of the degree of unevenness of the floor surface such as rates of rise and/or rates of fall of the floor surface.

Figure 19A:
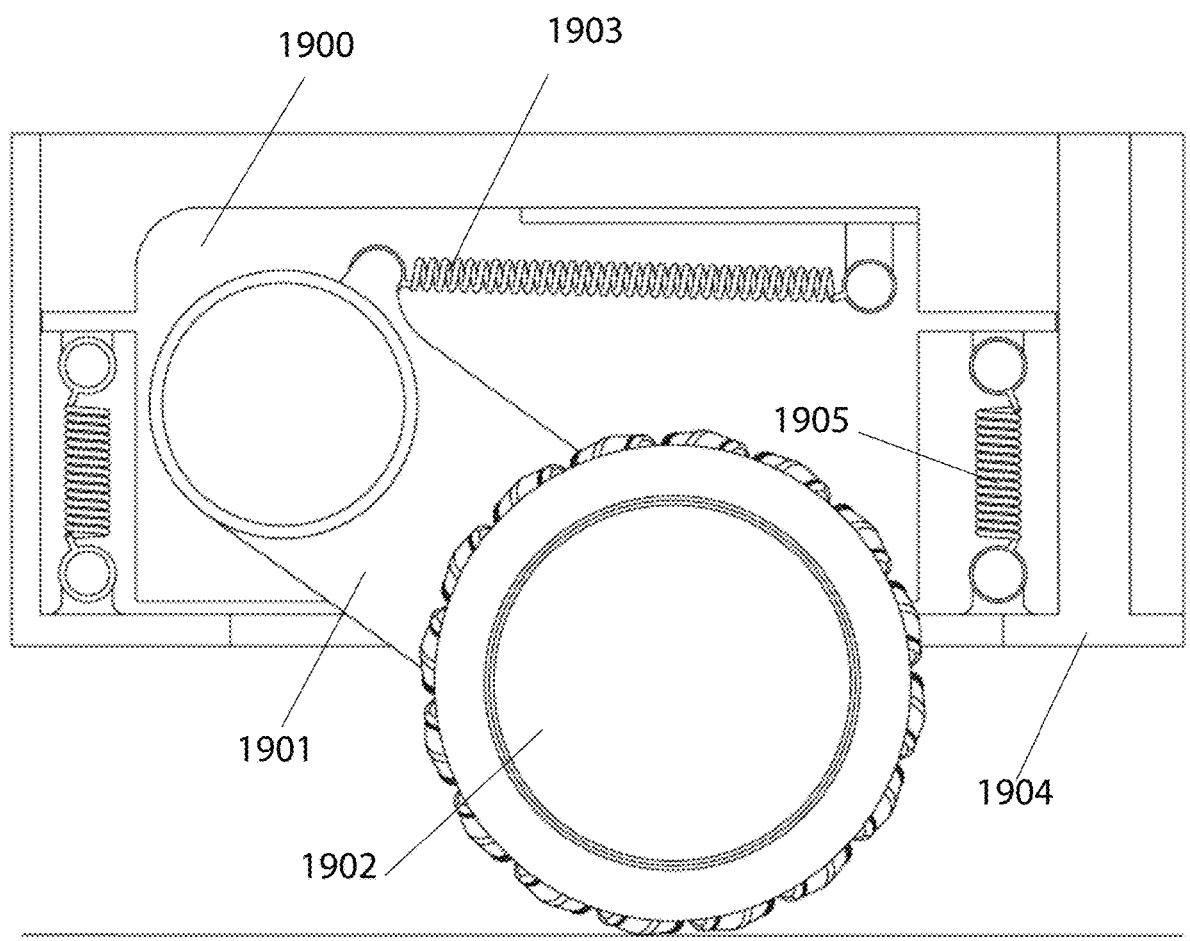
FIGS. 19A and 19B illustrate an example of a dual suspension system of a robotic device when the wheel is extended and retracted, respectively, according to some embodiments.
Figure 19B:
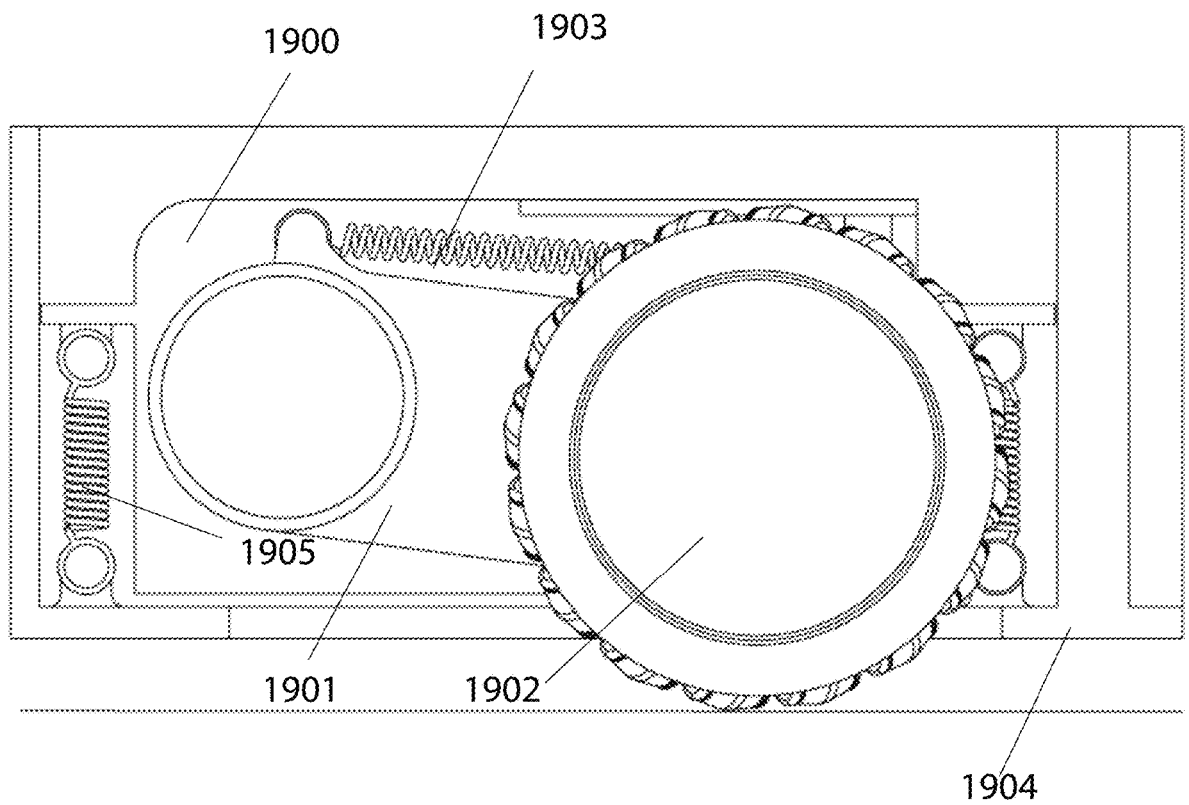

FIGS. 19A and 19B illustrate an example of dual suspension system including the first (FIGS. 17A and 17B) and second suspension (FIGS. 18A and 18B) systems as described above when the wheel is extended and retracted, respectively. The first suspension system includes a frame 1900, a rotating arm 1901 pivotally coupled to the frame 1900 on a first end and coupled to a wheel 1902 on a second end, and an extension spring 1903 coupled with the rotating arm on a third end and the frame 1900 on a fourth end. The second suspension system includes a base 1904 slidingly coupled with the frame 1900, and a set of vertically positioned extension springs 1905 coupled with the frame 1900 on a first end and the base 1904 on a second end. In some embodiments, magnets are used in addition to or instead of extension springs in the second suspension system. In some embodiments, the first and second suspension systems are used independently and in other embodiments, are used in combination. In some embodiments, other types of wheel suspension systems are used. Examples of wheel suspension systems are described in U.S. patent application Ser. No. 15/951,096, the entire contents of which are hereby incorporated by reference.

The techniques described herein can be applied to various types of semi-autonomous and autonomous robotic devices. For example, robotic towing devices, robotic food delivery devices, robotic ambulances, robotic transit systems, robotic cars, robotic cleaning devices, robotic refuse container, robotic trashcan, robotic transport device, robotic bus, robotic bicycle, robotic train, robotic pet, and the like. Examples of robotic devices to which the techniques described herein may be applied are described in U.S. patent application Ser. Nos. 16/127,038, 16/230,805, 16/129,757, 16/127,038, 16/243,524, 62/672,878, 62/729,015, and 16/751,115, the entire contents of which are hereby incorporated by reference.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching.

In block diagrams, illustrated components are depicted as discrete functional blocks, but embodiments are not limited to systems in which the functionality described herein is organized as illustrated. The functionality provided by each of the components may be provided by specialized software or specially designed hardware modules that are differently organized than is presently depicted; for example, such software or hardware may be intermingled, conjoined, replicated, broken up, distributed (e.g. within a data center or geographically), or otherwise differently organized. The functionality described herein may be provided by one or more processors of one or more computers executing specialized code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The invention claimed is:

1. A robot, comprising:
   a chassis;
   a set of wheels;
   a plurality of sensors;
   a camera;
   a processor;
   a tangible, non-transitory, machine-readable memory storing instructions that when executed by the processor effectuate operations comprising:
      capturing, with the camera, spatial data of surroundings of the robot;
      generating, with the processor, a spatial model of the surroundings based on at least the spatial data of the surroundings;
      generating, with the processor, a movement path based on the spatial model of the surroundings;
      inferring, with the processor, a location of the robot, comprising at least:
         capturing, with at least one sensor of the plurality of sensors, at least one measurement of the surroundings of the robot;
      extracting, with the processor, at least one feature of debris based on at least some data captured by the plurality of sensors;
      inferring, with the processor, a debris type of the debris based on a comparison between the at least one feature and features associated with different debris types stored in a database;
      actuating, with the processor, the robot to clean or avoid the debris based on the debris type of the debris, wherein the robot is actuated to at least avoid debris with a debris type of feces;
      actuating, with the processor, the robot to vacuum or mop based on sensor data indicative of an absence of a user within the surroundings; and
      capturing, with the at least one sensor, additional measurement within successively increasing search radii until the processor obtains a measurement that can be used to infer the location of the robot.

2. The robot of claim 1, wherein the operations further comprise:
   capturing, with a sensor of the plurality of sensors, a plurality of debris data as the robot moves within the surroundings;
   associating, with the processor, each debris data with a location of the robot at a time when the respective debris data was captured; and
   wherein an application of a communication device paired with the robot displays locations with debris accumulation within the spatial model.

3. The robot of claim 2, wherein the operations further comprise:
   adjusting, with the processor, a coverage path of the robot based on the locations with debris accumulation.

4. The robot of claim 1, wherein the operations further comprise:
   adjusting or determining, with the processor, an operational schedule of the robot based on sensor data indicative of an absence or presence of a user within the surroundings.

5. The robot of claim 1, wherein the operations further comprise:
   capturing, with a floor sensor, data indicative of a floor type as the robot moves within the surroundings; and
   adjusting, with the processor, a vacuum power of the robot based on the data, wherein the vacuum power is increased when the floor type is carpet.

6. The robot of claim 1, wherein the operations further comprise:
   capturing, with a floor sensor, data indicative of a floor type as the robot moves within the surroundings; and
   adjusting, with the processor, a movement path of the robot based on the data, wherein the movement path is adjusted to avoid areas with a carpet floor type when the robot is mopping.

7. The robot of claim 1, wherein the operations further comprise:
   segmenting, with the processor of the robot, the spatial model of the surroundings into a plurality of rooms.

8. The robot of claim 1, wherein:
   the robot further comprises a light source; and
   the light source is positioned adjacent to the camera.

9. The robot of claim 1, wherein the operations further comprise:
   generating, with the processor, a first movement path covering at least part of the surroundings;
   actuating, with the processor, the robot to move along the first movement path, wherein actuating the robot to move along at least a portion of the first movement path comprises a repetitive iteration of:
      actuating, with the processor, the robot to traverse a first linear segment;
      actuating, with the processor, the robot to rotate 180 degrees in a first rotation, wherein the first rotation comprises traversing a distance in a direction perpendicular to the first linear segment after starting the first rotation and before finishing the first rotation;
      actuating, with the processor, the robot to traverse a second linear segment; and
      actuating, with the processor, the robot to rotate 180 degrees in a second rotation, wherein the second rotation comprises traversing the distance in a direction perpendicular to the second linear segment after starting the second rotation and before finishing the second rotation.

10. The robot of claim 9, wherein the distance is less than a coverage width of the robot.

11. The robot of claim 1, wherein the bristles are secured to the at least one arm and one another using one or more of the following techniques:
    stitching at least one line across the bristles, stitching two lines in opposite directions diagonally across the width of the bristles, or stitching a crisscross pattern across the bristles.

12. The robot of claim 11, wherein:
    the at least one stitched line across the bristles is in a direction perpendicular to the length of the bristles; and
    the stitched crisscross pattern across the bristles is in a direction perpendicular to the length of the bristles.

13. The robot of claim 1, wherein the operations further comprise:
- detecting, with a sensor of the plurality of sensors, debris accumulation as the robot moves within the surroundings, wherein the robot prioritizes cleaning an area with detected debris accumulation prior to continuing on with cleaning other areas.

14. The robot of claim 1, wherein:
- the robot further comprises a main brush and a peripheral brush;
- the peripheral brush comprises a plurality of arms; and
- at least one arm of the peripheral brush comprises bristles extending from the respective arm, the bristles being secured to the at least one arm and one another with stitching to prevent the bristles from being forcibly plucked during operation of the robot.

15. A tangible, non-transitory, machine-readable memory storing instructions that when executed by a processor of a robot effectuate operations comprising:
- capturing, with a camera disposed on the robot, spatial data of surroundings of the robot;
- generating, with the processor, a spatial model of the surroundings based on at least the spatial data of the surroundings;
- generating, with the processor, a movement path based on the spatial model of the surroundings;
- inferring, with the processor, a location of the robot, comprising at least:
  - capturing, with at least one sensor of a plurality of sensors disposed on the robot, at least one measurement of the surroundings of the robot;
- extracting, with the processor, at least one feature of debris based on at least some data captured by the plurality of sensors;
- inferring, with the processor, a debris type of the debris based on a comparison between the at least one feature and features associated with different debris types stored in a database;
- actuating, with the processor, the robot to clean or avoid the debris based on the debris type of the debris, wherein the robot is actuated to at least avoid debris with a debris type of feces;
- actuating, with the processor, the robot to vacuum or mop based on sensor data indicative of an absence of a user within the surroundings; and
- capturing, with the at least one sensor, additional measurement within successively increasing search radii until the processor obtains a measurement that can be used to infer the location of the robot.

16. The memory of claim 15, wherein:
- the robot further comprises a main brush and a peripheral brush;
- the peripheral brush comprises a plurality of arms; and
- at least one arm of the peripheral brush comprises bristles extending from the respective arm, the bristles being secured to the at least one arm and one another with stitching to prevent the bristles from being forcibly plucked during operation of the robot.

17. A method for operating a robot, comprising:
- capturing, with a camera disposed on the robot, spatial data of surroundings of the robot;
- generating, with the processor, a spatial model of the surroundings based on at least the spatial data of the surroundings;
- generating, with the processor, a movement path based on the spatial model of the surroundings;
- inferring, with the processor, a location of the robot, comprising at least:
  - capturing, with at least one sensor of a plurality of sensors disposed on the robot, at least one measurement of the surroundings of the robot;
- extracting, with the processor, at least one feature of debris based on at least some data captured by the plurality of sensors;
- inferring, with the processor, a debris type of the debris based on a comparison between the at least one feature and features associated with different debris types stored in a database;
- actuating, with the processor, the robot to clean or avoid the debris based on the debris type of the debris, wherein the robot is actuated to at least avoid debris with a debris type of feces;
- actuating, with the processor, the robot to vacuum or mop based on sensor data indicative of an absence of a user within the surroundings; and
- capturing, with the at least one sensor, additional measurement within successively increasing search radii until the processor obtains a measurement that can be used to infer the location of the robot.

18. The method of claim 17, wherein:
- the robot further comprises a main brush and a peripheral brush;
- the peripheral brush comprises a plurality of arms; and
- at least one arm of the peripheral brush comprises bristles extending from the respective arm, the bristles being secured to the at least one arm and one another with stitching to prevent the bristles from being forcibly plucked during operation of the robot.

* * * * *